(12) United States Patent (10) Patent No.: US 12,436,561 B2
Yun (45) Date of Patent: Oct. 7, 2025

(54) DISPLAY DEVICE

(71) Applicant: LG Display Co., Ltd., Seoul (KR)

(72) Inventor: Jun Ho Yun, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 178 days.

(21) Appl. No.: 18/345,912

(22) Filed: Jun. 30, 2023

(65) Prior Publication Data

US 2024/0219959 A1 Jul. 4, 2024

(30) Foreign Application Priority Data

Dec. 28, 2022 (KR) .................. 10-2022-0186737

(51) Int. Cl.
*G06F 1/16* (2006.01)
*H04M 1/02* (2006.01)
*G06F 3/0488* (2022.01)

(52) U.S. Cl.
CPC ........ *G06F 1/1624* (2013.01); *H04M 1/0237* (2013.01); *G06F 3/0488* (2013.01)

(58) Field of Classification Search
CPC .... G06F 1/1624; G06F 3/0488; G06F 1/1637; G06F 1/1652; G06F 1/1686; H04M 1/0237; H04M 1/0268; G09F 9/301; H10K 50/84; H10K 77/111; H10K 2102/311
See application file for complete search history.

(56) References Cited

U.S. PATENT DOCUMENTS

| | | | | |
|---|---|---|---|---|
| 10,820,433 B2 * | 10/2020 | Cha | ....................... | H05K 5/0226 |
| 11,029,733 B2 * | 6/2021 | Lee | ....................... | G06F 1/1626 |
| 11,315,443 B2 * | 4/2022 | Han | ....................... | G06F 1/1624 |
| 11,416,036 B2 * | 8/2022 | Yin | ....................... | G06F 1/1652 |
| 11,994,913 B2 * | 5/2024 | Jin | ....................... | G06F 1/1601 |
| 2018/0103550 A1 * | 4/2018 | Seo | ....................... | G06F 1/1601 |
| 2018/0103552 A1 * | 4/2018 | Seo | ....................... | G09F 9/301 |
| 2019/0268455 A1 * | 8/2019 | Baek | ....................... | G06F 1/1652 |
| 2020/0035133 A1 * | 1/2020 | Pyo | ....................... | F16M 13/02 |
| 2021/0074189 A1 * | 3/2021 | Kwon | ....................... | G06F 1/1652 |

(Continued)

FOREIGN PATENT DOCUMENTS

| | | |
|---|---|---|
| KR | 20200013821 A | 2/2020 |
| KR | 20200034277 A | 3/2020 |
| KR | 20200128319 A | 11/2020 |

*Primary Examiner* — Rockshana D Chowdhury
(74) *Attorney, Agent, or Firm* — Seed Intellectual Property Law Group LLP

(57) ABSTRACT

A display device disclosed, the display device includes a base; a sliding module slidably disposed on the base in a first direction; and a display panel module having one side fixed to the base and the other side fixed to the sliding module, wherein the sliding module includes a body, two sidewalls disposed on one side and the other side of the body, a middle support coupled to the body, and two rollers rotatably disposed between the sidewalls and the middle support. The display panel module includes a display panel and a first roll belt and a second roll belt disposed to be spaced apart from each other on a rear surface of the display panel in a second direction. The first roll belt and the second roll belt each includes a first protrusion supported by the middle support and a second protrusion supported by the sidewalls. The creasing or lifting phenomenon formed on a display panel may be minimized by using the middle support.

19 Claims, 17 Drawing Sheets

(56) References Cited

U.S. PATENT DOCUMENTS

| | | | |
|---|---|---|---|
| 2021/0368032 A1* | 11/2021 | Liao | G06F 1/1681 |
| 2021/0373603 A1* | 12/2021 | Feng | G06F 1/1624 |
| 2021/0375165 A1* | 12/2021 | Feng | G09F 9/301 |
| 2022/0011821 A1* | 1/2022 | Han | G06F 1/1652 |
| 2022/0019264 A1* | 1/2022 | Cho | G06F 1/1652 |
| 2022/0174829 A1* | 6/2022 | Choi | G06F 1/1624 |
| 2022/0232716 A1* | 7/2022 | Lim | H10K 77/00 |
| 2022/0240400 A1* | 7/2022 | Zhou | H05K 5/0217 |
| 2022/0253104 A1* | 8/2022 | Luo | G06F 1/1681 |
| 2022/0337688 A1* | 10/2022 | Sang | H04M 1/0268 |
| 2022/0342448 A1* | 10/2022 | Shin | G06F 1/1624 |
| 2022/0417355 A1* | 12/2022 | Liu | G06F 1/1652 |
| 2023/0078747 A1* | 3/2023 | Ahn | G06F 1/1652 361/679.01 |
| 2023/0122323 A1* | 4/2023 | Kwak | G06F 3/0448 361/679.27 |

\* cited by examiner

DISPLAY DEVICE

CROSS-REFERENCE TO RELATED APPLICATION

This application claims priority to and the benefit of Korean Patent Application No. 10-2022-0186737, filed Dec. 28, 2022, the disclosure of which is incorporated herein by reference in its entirety.

BACKGROUND

Technical Field

Embodiments relate to a display device. In particular, the embodiments relate to a slidable display device.

Description of the Related Art

In general, electronic devices such as smart phones, digital cameras, notebook computers, navigation devices, and smart TVs that provide images to users include a display device for displaying an image. The display device generates an image and provides the generated image to a user through a display screen.

With the development of display device technology, various types of display devices are being developed. For example, a bendable display device, a foldable display device, a flexible display device, a rollable display device, and a slidable display device are being developed using a display panel in which organic light emitting diodes (OLEDs) are formed on each pixel on a bendable plastic substrate. In addition, the application fields of such a display device, such as a Television (TV), an automobile display, and a wearable device, as well as a mobile device, are expanding.

In a slidable display device, by pulling a display panel out of a case as needed, a display area where an image is displayed may be expanded.

However, the display panel used in the slidable display device may cause a creasing or lifting phenomenon in a rolling area, and the creasing or lifting phenomenon is intensified toward the center of the display panel. Here, the rolling area is one area of the display panel, and may mean one area of the display panel disposed to correspond to a roller used in the slidable display device.

BRIEF SUMMARY

Embodiments according to the present disclosure are to provide a display device that minimizes the creasing or lifting phenomenon formed on a display panel by using a plurality of roll belts formed in a two-division structure and a middle support disposed between the roll belts.

The embodiments are to provide a display device that minimizes the creasing or lifting phenomenon formed on the display panel by suggesting various structures for the roll belt.

Technical benefits achieved by embodiments are not limited to the objectives described above, and technical benefits which are not described above will be clearly understood by those skilled in the art from the following descriptions.

Technical benefits may be achieved by a display device, which include a base; a sliding module slidably disposed on the base in a first direction; and a display panel module having one side fixed to the base and the other side fixed to the sliding module, wherein the sliding module may include a body, two sidewalls disposed on one side and the other side of the body, a middle support coupled to the body, and two rollers rotatably disposed between the sidewall and the middle support, the display panel module may include a display panel, and a first roll belt and a second roll belt disposed to be spaced apart from each other on a rear surface of the display panel in a second direction, and the middle support is disposed between the first roll belt and the second roll belt to support end portions of each of the first roll belt and the second roll belt when the sliding module is moved.

Technical benefits may be achieved by a display device which includes a base; a sliding module slidably disposed on the base in a first direction; and a display panel module having one side fixed to the base and the other side fixed to the sliding module, wherein the sliding module includes a body, two sidewalls disposed on one side and the other side of the body, a middle support coupled to the body, and two rollers rotatably disposed between the sidewall and the middle support, the display panel module may include a display panel, and a first roll belt and a second roll belt disposed to be spaced apart from each other on a rear surface of the display panel in a second direction, and the middle support may be disposed between the first roll belt and the second roll belt, an end portion of one side of the first roll belt may be disposed in a first groove of the middle support, and an end portion of one side of the second roll belt may be disposed in a second groove of the middle support.

Technical benefits may be achieved by a display device, which include a base; a sliding module slidably disposed on the base in a first direction; and a display panel module having one side fixed to the base and the other side fixed to the sliding module, wherein the sliding module may include a body, two sidewalls disposed on one side and the other side of the body, a middle support coupled to the body, and two rollers rotatably disposed between the sidewall and the middle support, the display panel module may include a display panel, and a first roll belt and a second roll belt disposed to be spaced apart from each other on a rear surface of the display panel in a second direction, and the first roll belt and the second roll belt each may include a first protrusion supported by the middle support and a second protrusion supported by the sidewall. In addition, the above objectives to be achieved may be achieved by a display device, which include a base; a sliding module slidably disposed on the base in a first direction; and a display panel module having one side fixed to the base and the other side fixed to the sliding module, wherein the sliding module includes a body, two sidewalls disposed on one side and the other side of the body, a middle support coupled to the body, and two rollers rotatably disposed between the sidewalls and the middle support, the display panel module includes a display panel and a first roll belt and a second roll belt disposed to be spaced apart from each other on a rear surface of the display panel in a second direction, and the middle support includes a first surface and a second surface in contact with the display panel.

In the embodiments, the creasing or lifting phenomenon formed on a display panel may be minimized by using the middle support disposed between a plurality of roll belts formed in a two-division structure to support the roll belts.

In the embodiments, the lifetime of the display panel is improved by minimizing the creasing or lifting phenomenon formed on the display panel, thereby reducing production power consumption.

Various useful technical features and effects of the embodiments are not limited to the above-described contents and will be more easily understood from descriptions of the specific embodiments.

BRIEF DESCRIPTION OF THE SEVERAL VIEWS OF THE DRAWINGS

The above and other technical benefits, features, and technical effects of the present disclosure will become more apparent to those of ordinary skill in the art by describing exemplary embodiments thereof in detail with reference to the attached drawings, in which.

DETAILED DESCRIPTION

Figure 1:
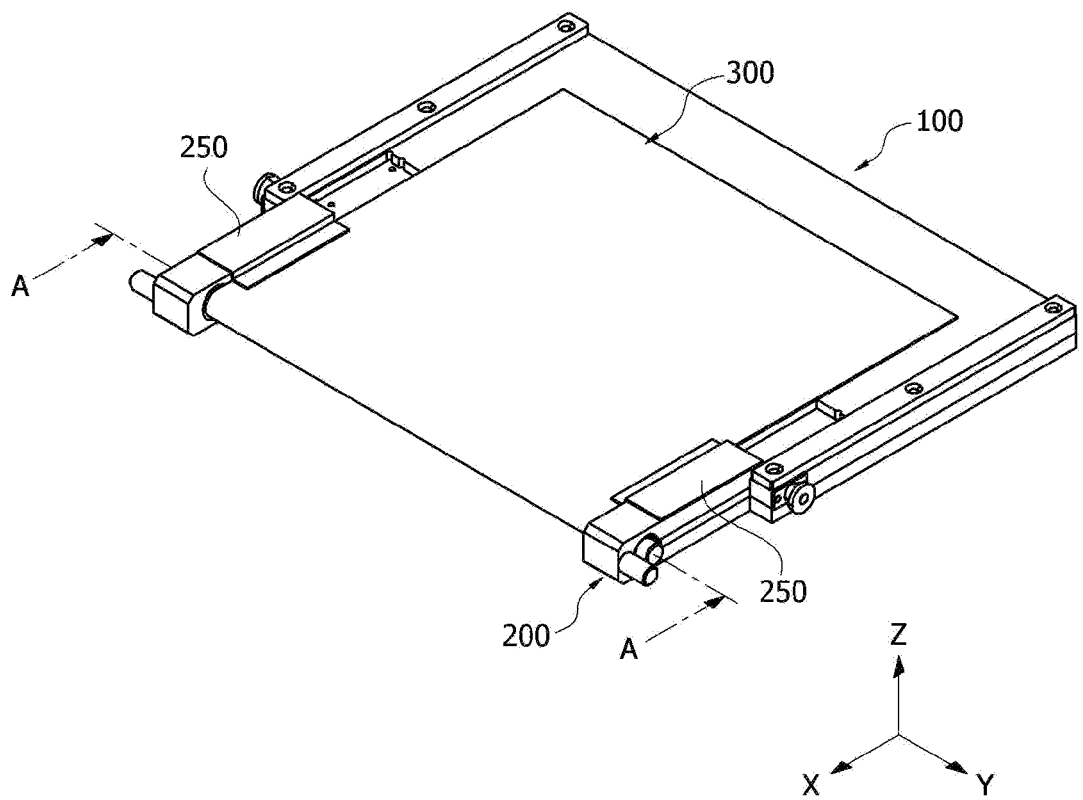
FIG. 1 is a perspective view of a display device according to one embodiment of the present disclosure.

Advantages and features of the present disclosure and methods to achieve them will become apparent from the descriptions of embodiments herein below with reference to the accompanying drawings. However, the present disclosure is not limited to the embodiments disclosed herein but may be implemented in various different forms. The embodiments are provided for making the disclosure of the present disclosure thorough and for fully conveying the scope of the present disclosure to those skilled in the art.

Shapes, sizes, ratios, angles, numbers, and the like disclosed in the drawings for describing the embodiments of the present disclosure are exemplary, and the present disclosure is not limited to the illustrated items. Like reference numerals refer to like elements throughout. In addition, in describing the present disclosure, if it is determined that the detailed description of the related known technology may unnecessarily obscure the subject matter of the present disclosure, the detailed description thereof will be omitted.

When "include," "have," "consist," or the like mentioned in the present specification, other parts may be added unless "only" is used. In the case where the component is expressed in the singular, the singular includes the plural unless specifically stated otherwise.

In interpreting a component, it is interpreted to include an error range even if there is no separate description.

In the case of the description of the positional relationship, for example, if the positional relationship of the two parts is described as "on," "above," "bottom," "next to," etc., one or more other parts may be located between the two parts unless the term "directly" or "immediately" is explicitly used.

In the description for the embodiments, the first, second, etc., are used to describe various components, but these components are not limited by these terms. These terms are only used to distinguish one component from another. Therefore, the first component mentioned below may be a second component within the technical spirit of the present disclosure.

Throughout the specification, the same reference numerals refer to the same component.

The features of each of the various embodiments may be coupled or combined with each another, in whole or in part, and various technical interlocking and driving may be possible, and each of the embodiments may be implemented independently of each other or in conjunction with each other.

Recently, in the information society, the importance of display devices as visual information delivery media has been further emphasized, and they have been improved to meet requirements such as low power consumption, thinning, light weight, high definition, and high efficiency.

A display device according to one embodiment of the present disclosure may minimize the creasing or lifting phenomenon formed on a display panel by using a middle support supporting a plurality of roll belts formed in a two-division structure. In addition, by improving the lifetime of the display panel according to the improvement in durability of the display panel, production power consumption may be reduced.

Figure 2:
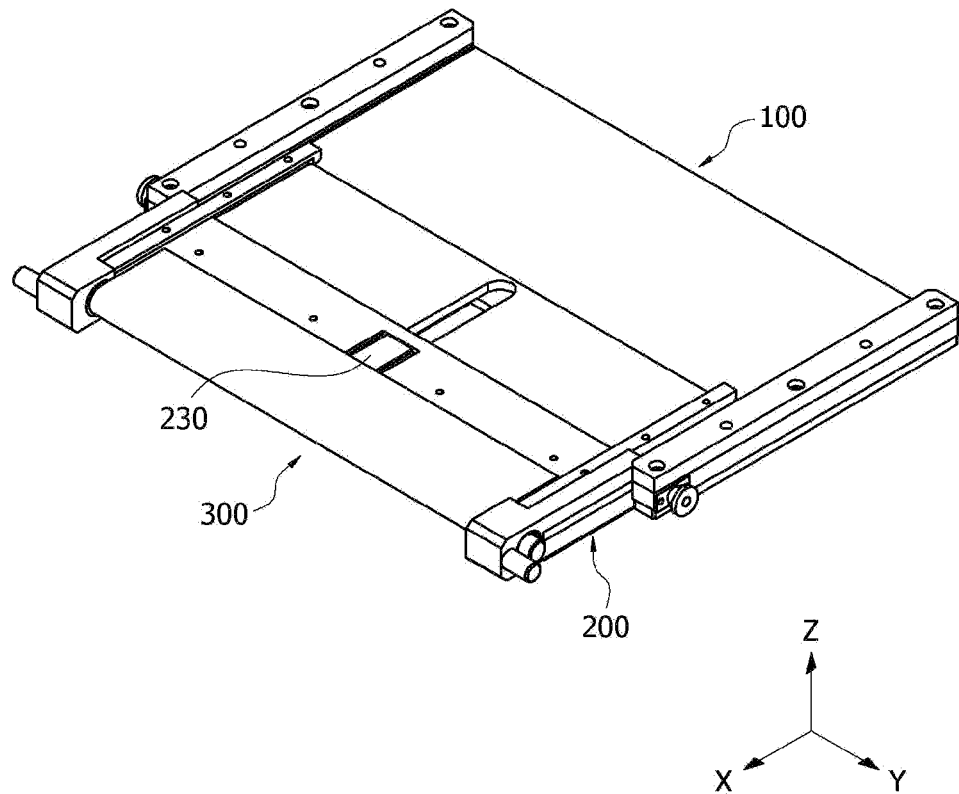
FIG. 2 is a bottom perspective view of a display device according to one embodiment of the present disclosure.
Figure 3:
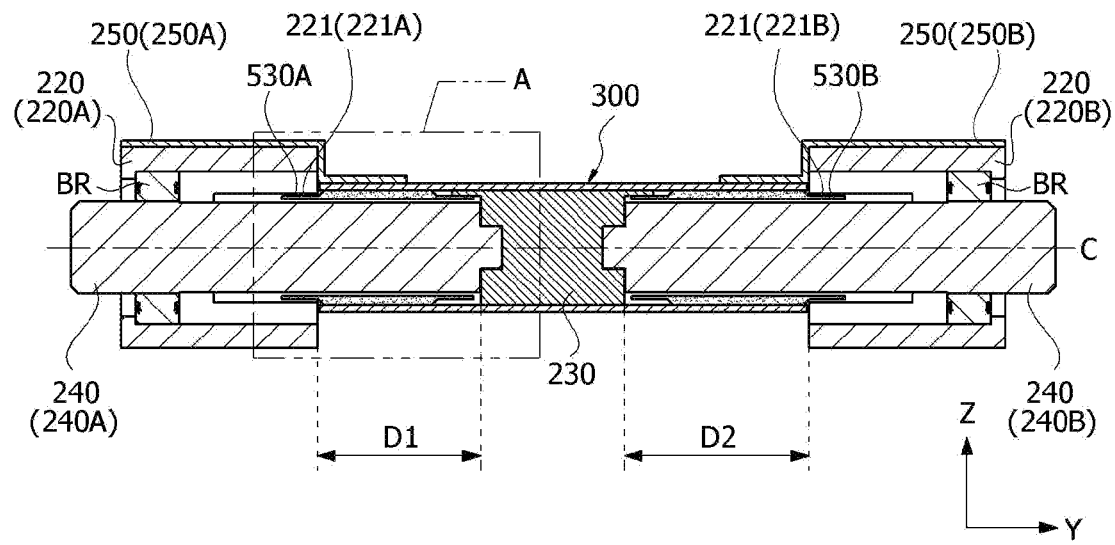
FIG. 3 is a cross-sectional view of a display device according to one embodiment of the present disclosure.
Figure 4:
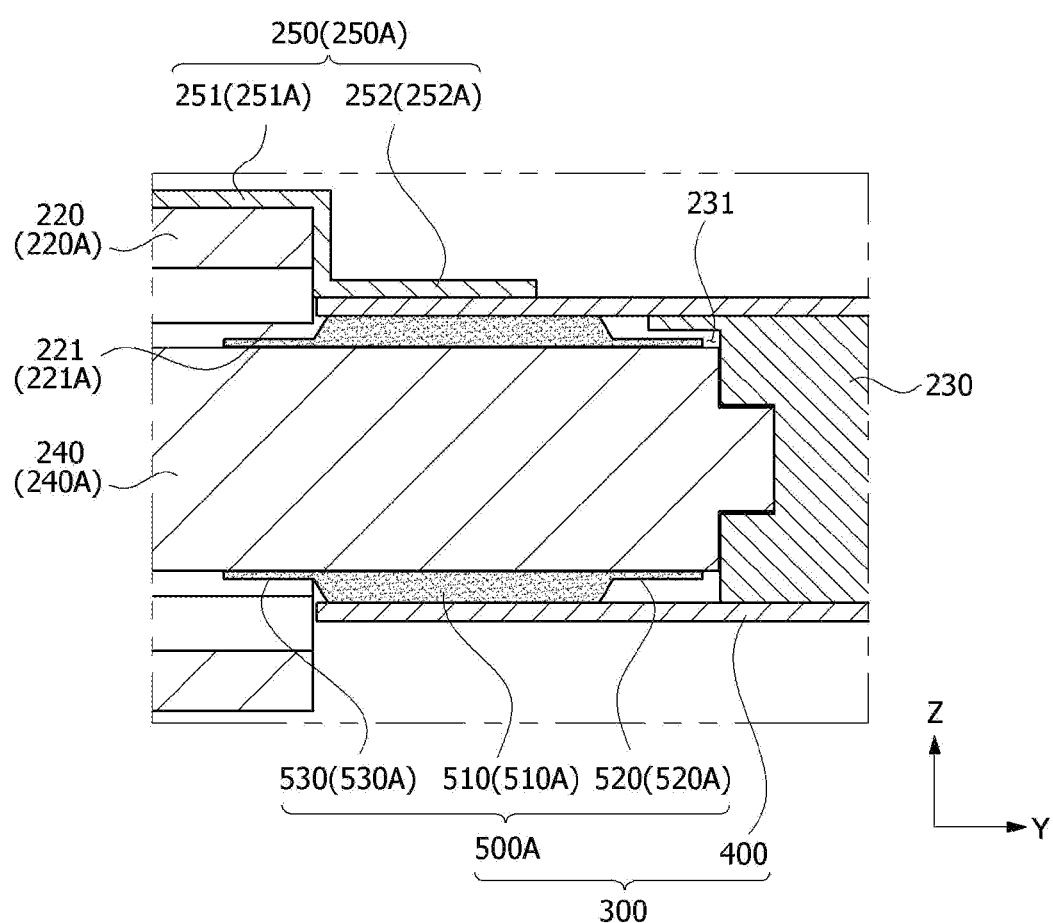
FIG. 4 is an enlarged view showing an area A shown in FIG. 3.
Figure 5:
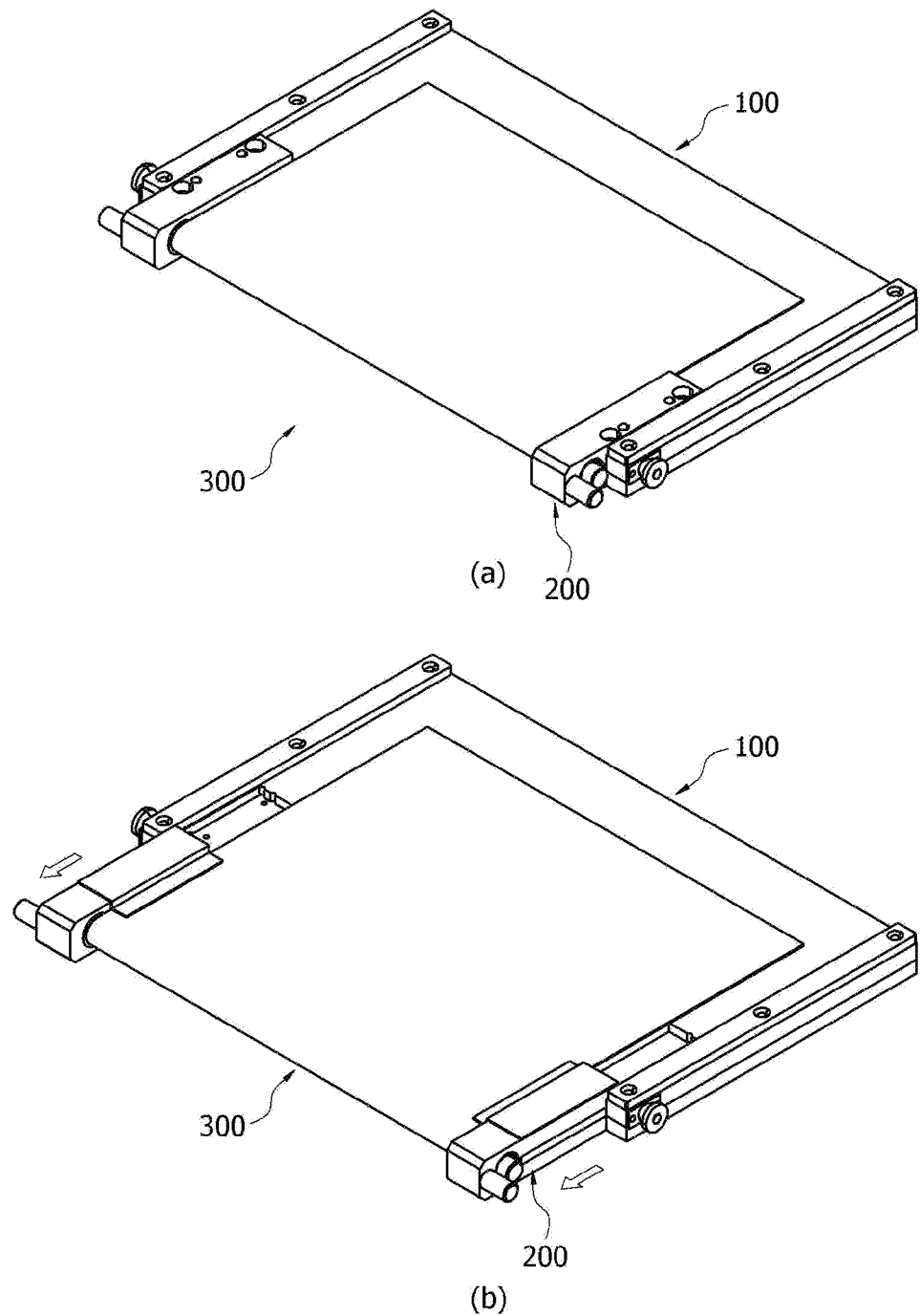
FIG. 5 is a view illustrating movement of a sliding module disposed in a display device according to one embodiment of the present disclosure.
Figure 6:
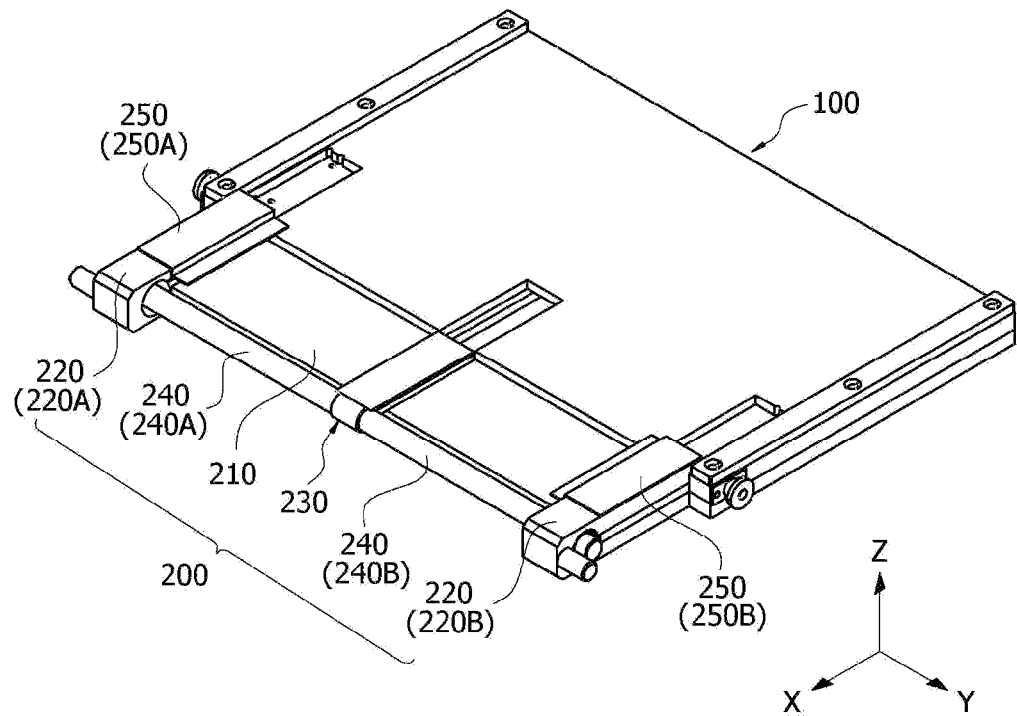
FIG. 6 is a perspective view illustrating a base and a sliding module of a display device according to one embodiment of the present disclosure.
Figure 7:
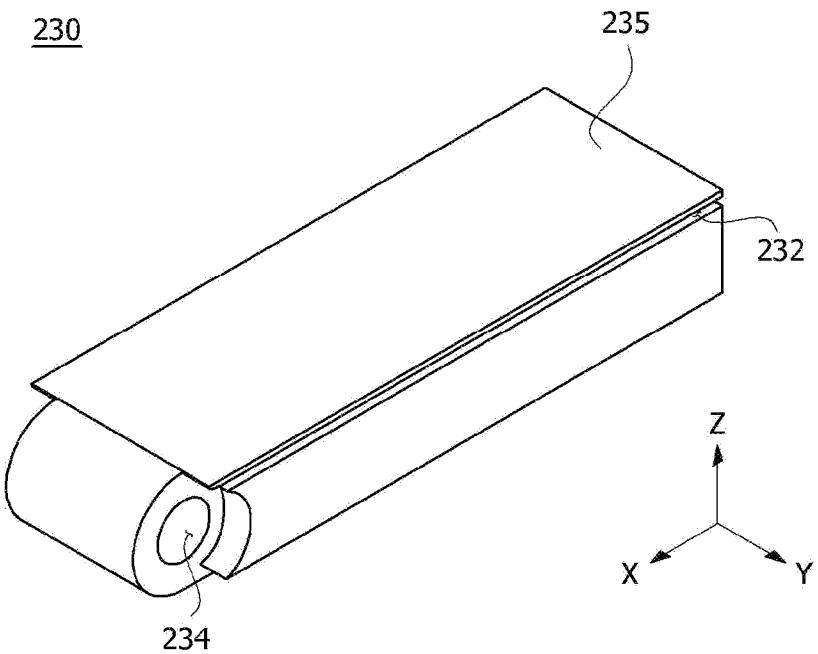
FIG. 7 is a perspective view illustrating a middle supporter of a display device according to one embodiment of the present disclosure.
Figure 8:
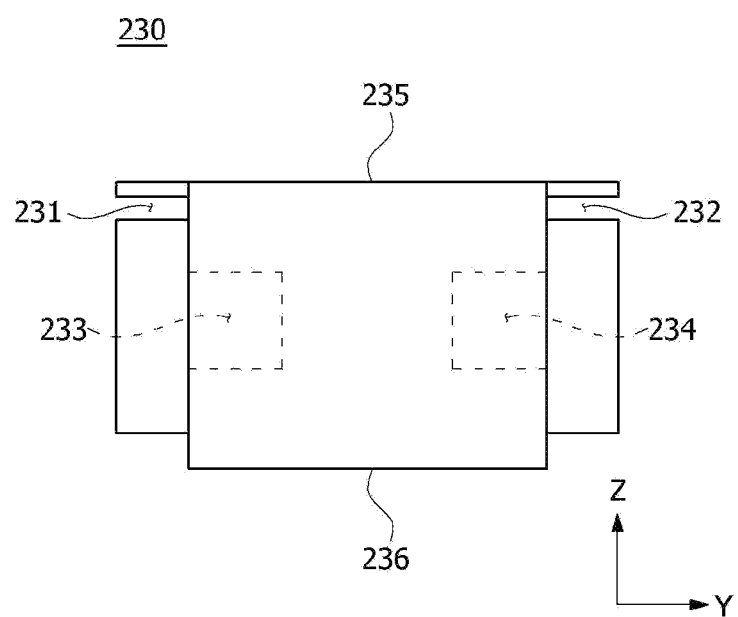
FIG. 8 is a front view illustrating a middle supporter of a display device according to one embodiment of the present disclosure.
Figure 9:
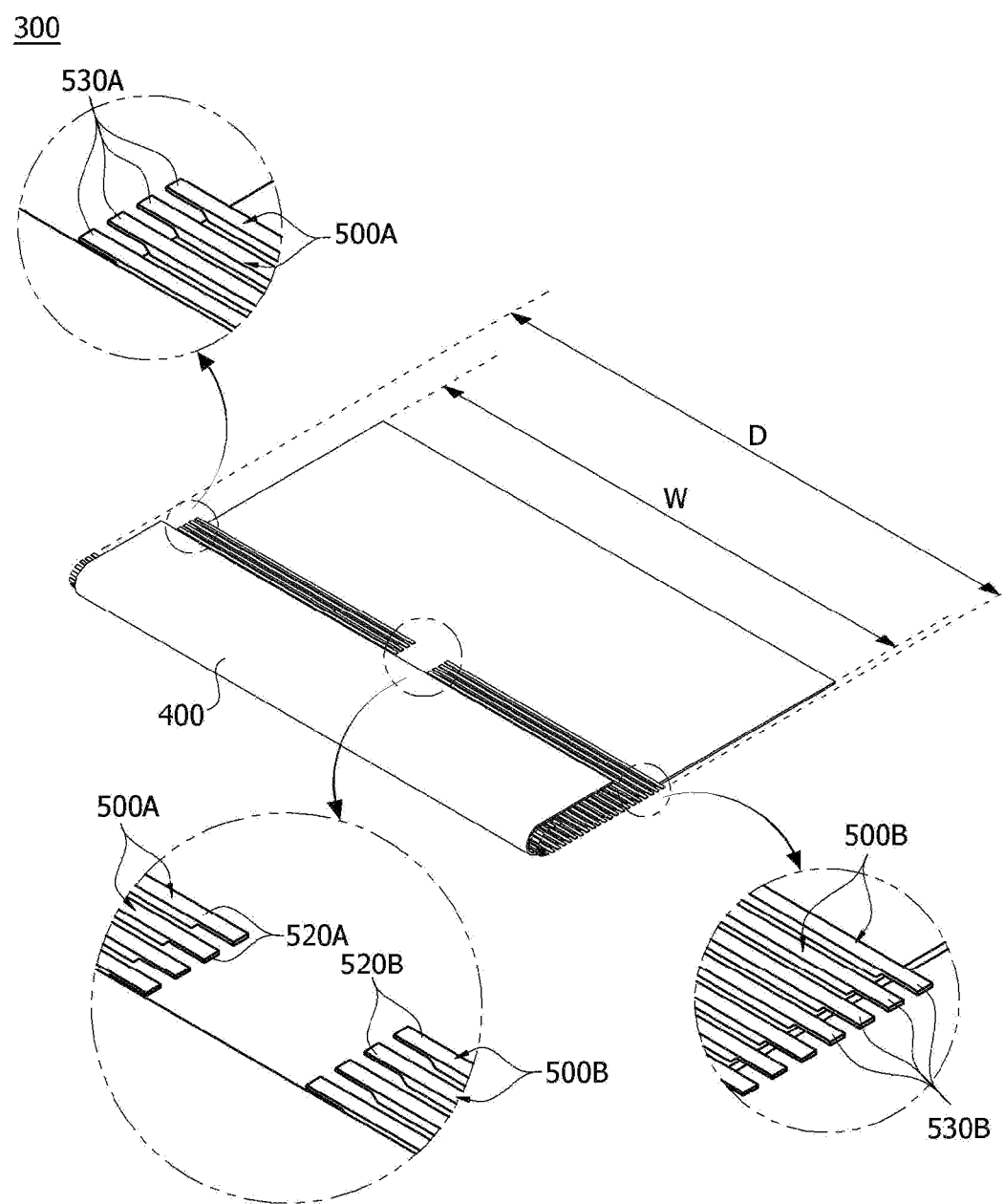
FIG. 9 is a bottom perspective view illustrating a display panel module of a display device according to one embodiment of the present disclosure.

FIG. 1 is a perspective view of a display device according to one embodiment of the present disclosure, FIG. 2 is a bottom perspective view of a display device according to one embodiment of the present disclosure, FIG. 3 is a cross-sectional view of a display device according to one embodiment of the present disclosure, FIG. 4 is an enlarged view showing an area A shown in FIG. 3, FIG. 5 is a view illustrating movement of a sliding module disposed in a display device according to one embodiment of the present disclosure, FIG. 6 is a perspective view illustrating a base and a sliding module of a display device according to one embodiment of the present disclosure, FIG. 7 is a perspective view illustrating a middle supporter of a display device according to one embodiment of the present disclosure, FIG. 8 is a front view illustrating a middle supporter of a display device according to one embodiment of the present disclosure, and FIG. 9 is a bottom perspective view illustrating a display panel module of a display device according to one embodiment of the present disclosure.

The X-axis direction shown in FIGS. 1 to 3 may mean a first direction, a longitudinal direction, a movement direction, or a vertical direction. In addition, the Y-axis direction may mean a second direction, a width direction, or a horizontal direction. Further, the Z-axis direction may mean a third direction, an up and down direction, or a thickness direction. Accordingly, a display panel 400 has a length in the X-axis direction, a width in the Y-axis direction, and a thickness in the Z-axis direction. Here, the width and length of the display panel 400 may be set to various design values depending on the application field of the display device.

Meanwhile, the X-axis direction, the Y-axis direction, and the Z-axis direction may be perpendicular to each other, but may also mean different directions that are not perpendicular to each other. In addition, planes extending in the X-axis direction and the Y-axis direction may mean a horizontal plane. Further, reference numeral "C" shown in FIG. 3 may indicate a rotation center of a roller 240.

Referring to FIGS. 1 to 9, a display device according to one embodiment of the present disclosure may include a base 100, a sliding module 200 slidably disposed on the base 100 in the first direction, and a display panel module 300 having one side fixed to the base 100 and the other side fixed to the sliding module 200. Here, the display panel module 300 may include a display panel 400 and a first roll belt 500A and a second roll belt 500B disposed to be spaced apart from each other in the second direction on the rear surface of the display panel 400.

Referring to FIG. 5, the display device according to one embodiment of the present disclosure varies a display area exposed of the display panel 400 by pushing or pulling the sliding module 200 in a first direction, such that a screen size of the display area may be expanded or reduced.

The base 100, the sliding module 200, and the display panel module 300 may form the outer appearance of the display device.

The base 100 may be formed in a plate shape and may include a hole, a groove, and the like for accommodating a portion of the sliding module. In addition, the base 100 may include a linear guide such as a guide rail for guiding a linear movement of the sliding module 200.

In addition, one side of the display panel module 300 may be fixed to the base 100 through attachment or the like. In detail, one side of the lower surface of the display panel 400 may be fixed to the base 100.

The sliding module 200 may be pushed or pulled in the first direction based on the base 100 by the user, but is not necessarily limited thereto. For example, the base 100 may include an actuator (not shown) for driving the sliding module 200 on one side inside or outside. Here, the actuator is a component that slides the sliding module 200 and may include a motor, a gear device or the like. Accordingly, the sliding module 200 may be moved in the first direction by driving the actuator.

The sliding module 200 may include a body 210, two side walls 220 disposed on one side and the other side of the body 210, a middle support 230 coupled to the body 210, and two rollers 240 rotatably disposed between the side walls 220 and the middle support 230. In addition, the sliding module 200 may further include a cover 250 disposed on the side walls 220. Here, the sidewalls 220 may include a first sidewall 220A and a second sidewall 220B. In addition, the roller 240 may include a first roller 240A and a second roller 240B.

The body 210 may be formed in a plate shape. In addition, the sidewalls 220 and the middle support 230 may be coupled to the body 210. In addition, the body 210 may perform a sliding movement in association with the sliding movement of the side wall 220.

As shown in FIG. 2, the other side of the display panel module 300 may be fixed to the rear surface of the body 210 through attachment or the like. In detail, the other side of the lower surface of the display panel 400 may be fixed to the body 210.

The side walls 220 may be disposed on one side and the other side of the body 210 based on the second direction. Accordingly, the sidewalls 220 may include the first sidewall 220A and the second sidewall 220B.

The first sidewall 220A and the second sidewall 220B may be slidably disposed on the base 100 in the first direction. For example, the first sidewall 220A and the second sidewall 220B may perform a sliding movement in a first direction by driving an actuator or the like.

Each of the first sidewall 220A and the second sidewall 220B may be formed in a bar shape, and may include a hole formed for coupling with the roller 240 and a bearing BR disposed in the hole.

In addition, each of the first sidewall 220A and the second sidewall 220B may include steps 221 for supporting a second protrusion 530A of the first roll belt 500A and a second protrusion 530B of the second roll belt 500B. Accordingly, the steps 221 may minimize the creasing or lifting phenomenon formed on the display panel 400.

For example, a first step 221A formed on the first sidewall 220A may be disposed to be overlapped with the second protrusion 530A of the first roll belt 500A in the third direction. Accordingly, the first step 221A may support and guide the second protrusion 530A of the first roll belt 500A when the sliding module 200 is moved.

In addition, a second step 221B formed on the second sidewall 220B may be disposed to be overlapped with the second protrusion 530B of the second roll belt 500B in the third direction. Accordingly, the second step 221B may support and guide the second protrusion 530B of the second roll belt 500B when the sliding module 200 is moved.

The middle support 230 may be coupled to the body 210.

The middle support 230 may be formed in a bar shape and may be disposed between the first sidewall 220A and the second sidewall 220B based on the second direction.

In addition, the middle support 230 may be disposed to have a first separation distance D1 from the first sidewall 220A based on the second direction and may be disposed to have a second separation distance D2 from the second sidewall 220B based on the second direction. In this case, the first separation distance D1 and the second separation distance D2 may be the same. Accordingly, the middle support 230 may be disposed at the center of the body 210 in the second direction to prevent the creasing or lifting phenomenon that may occur on the display panel 400 from being biased to one side.

Referring to FIGS. 7 and 8, the middle support 230 may be formed in a polyhedral shape. In addition, the middle support 230 may include a first groove 231, a second groove 232 formed on the opposite side of the first groove 231, a third groove 233, and a fourth groove 234 formed on the opposite side of the third groove 233. Further, the middle support 230 may include a first surface 235 and a second surface 236 in contact with the display panel 400. Accordingly, the middle support 230 may reduce an area where the display panel module 300 is in contact with the roller 240. That is, by disposing the middle support 230, the area of the rolling area may be reduced, thereby the creasing or lifting phenomenon formed on a display panel, particularly, the rolling area may be minimized. Here, the first surface 235 may be an upper surface of the middle support 230 in the drawing, and the second surface 236 may be a lower surface of the middle support 230.

The first groove 231 may be concavely formed in the second direction and may be formed long in the first direction.

In addition, the first groove 231 may be disposed to correspond to the first protrusion 520A of the first roll belt 500A. Accordingly, since the first protrusion 520A of the first roll belt 500A is disposed inside the first groove 231, the middle support 230 may support and guide the first protrusion 520A of the first roll belt 500A.

The second groove 232 may be concavely formed in the second direction and may be formed long in the first direction.

In addition, the second groove 232 may be disposed to correspond to the first protrusion 520B of the second roll belt 500B. Accordingly, since the first protrusion 520B of the second roll belt 500B is disposed inside the second groove 232, the middle support 230 may support and guide the first protrusion 520B of the second roll belt 500B.

The third groove 233 may be concavely formed in the second direction and may be disposed to correspond to the first roller 240A. In this case, the third groove 233 may be formed to have a circular cross-section. In this case, the third groove 233 may be disposed to be spaced apart from the first groove 231.

The fourth groove 234 may be concavely formed in the second direction and may be disposed to correspond to the second roller 240B. In this case, the fourth groove 234 may be formed to have a circular cross-section. In this case, the fourth groove 234 may be disposed to be spaced apart from the second groove 232.

The first surface 235 and the second surface 236 may be planar and may be in surface contact with the display panel 400. Accordingly, the first surface 235 and the second surface 236 may support the display panel 400.

Meanwhile, grooves may be further formed in the middle support 230 symmetrically with the first groove 231 and the second groove 232 based on the center C. In detail, the grooves may be formed to correspond to the first protrusions 520A and 520B of the display panel module 300 disposed below the roller 240. Accordingly, the grooves may support and guide the first protrusions 520A and 520B of the display panel module 300 disposed below the roller 240.

The roller 240 may include the first roller 240A, which is rotatably disposed between the first side wall 220A and the middle support 230, and the second roller 240B, which is rotatably disposed between the second side wall 220B and the middle support 230. In this case, one side of the first roller 240A may be rotatably coupled to the first sidewall 220A, and the other side may be rotatably coupled to the third groove 233. In addition, one side of the second roller 240B may be rotatably coupled to the second sidewall 220B, and the other side may be rotatably coupled to the fourth groove 234.

When the sliding module 200 is moved, the roller 240 may be rotated by being in contact with the roll belts 500A and 500B. In this case, the display panel module 300 may be in contact with only a portion of the surface of the roller 240 instead of being rolled over the entire surface of the roller 240. Further, when the exposed display area of the display panel 400 is varied according to the movement of the sliding module 200, stress applied to the display panel module 300 may be reduced because the roller 240 is rotated together.

Meanwhile, considering that the roller 240 is in contact with the roll belts 500A and 500B formed of a metal material, it may be formed of a soft material. For example, the roller 240 may be formed of a soft material such as rubber, polyurethane and the like. Accordingly, the roller 240 may reduce the stress applied to the display panel module 300.

The cover 250 may be disposed on the two side walls 220. Accordingly, the cover 250 may include a first cover 250A disposed on the first sidewall 220A and a second cover 250B disposed on the second sidewall 220B. Here, the cover 250 may be referred to as a support cover or a support member. In this case, the cover 250 has a predetermined length in the first direction, and the length may be smaller than a length of the sidewalls 220 in the first direction. At this time, the cover 250 may be disposed so as not to be overlapped with the roller 240 in the third direction.

The cover 250 may include a first cover area 251 coupled to the sidewall 220 and a second cover area 252 extending from an end portion of the first cover area 251 in a second direction.

The first cover area 251 may be disposed so as to be overlapped with the second protrusions 530A and 530B in the third direction.

The second cover area 252 may be overlapped with an end portion along the second direction of the display panel 400 in the third direction. Accordingly, the cover 250 may support and guide the display panel 400. Here, the second cover area 252 may extend to be overlapped with belt body 510 of the roll belts 500A and 500B.

In this case, the second cover area 252 of the cover 250 may be disposed close to the middle support 230 without being overlapped with the second protrusions 530A and 530B. Accordingly, the second cover area 252 may be overlapped with a portion of the roll belts 500A and 500B in the third direction.

In addition, since the second cover area 252 of the cover 250 may be disposed above the display panel 400 to support the display panel 400, a problem where the creasing or lifting phenomenon is intensified in the display panel 400 can be suppressed.

The display panel module 300 may include the display panel 400 having a plate-shape and the first roll belt 500A and the second roll belt 500B on the rear surface of the display panel 400. Here, the first roll belt 500A and the second roll belt 500B may be disposed only on a partial area of the rear surface of the display panel 400. Accordingly, the display panel 400 is not in direct contact with the roller 240.

In this case, a width W of the display panel 400 in the second direction may be smaller than a distance D from one end of the second protrusion 530A of the first roll belt 500A to one end of the second protrusion 530B of the second roll belt 500B. Accordingly, the second protrusion 530A of the first roll belt 500A and the second protrusion 530B of the second roll belt 500B may be disposed to be exposed to the outside of the display panel 400 based on the second direction.

The display panel 400 may be formed of a flexible material capable of being bent or folded. In addition, cells of the display panel 400 may include a light emitting element (OLED) formed on a flexible plastic substrate.

Figure 10:
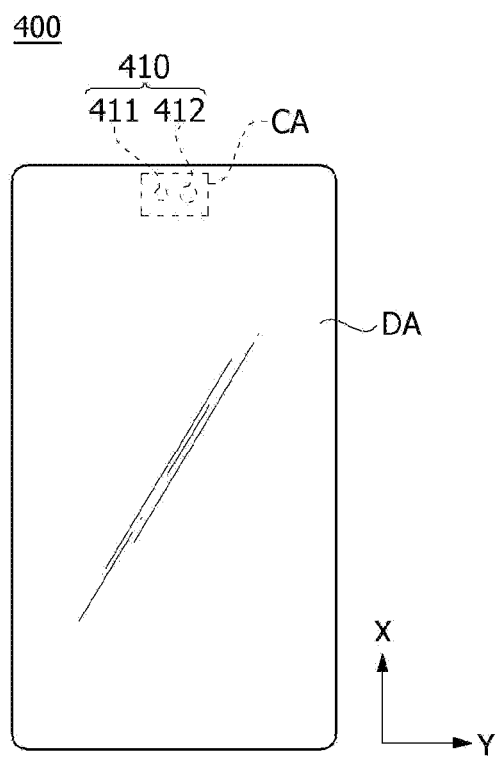
FIG. 10 is a view illustrating a relation of arrangement between a first display area and a second display area of a display panel and an optical device according to one embodiment of the present disclosure.
Figure 11:
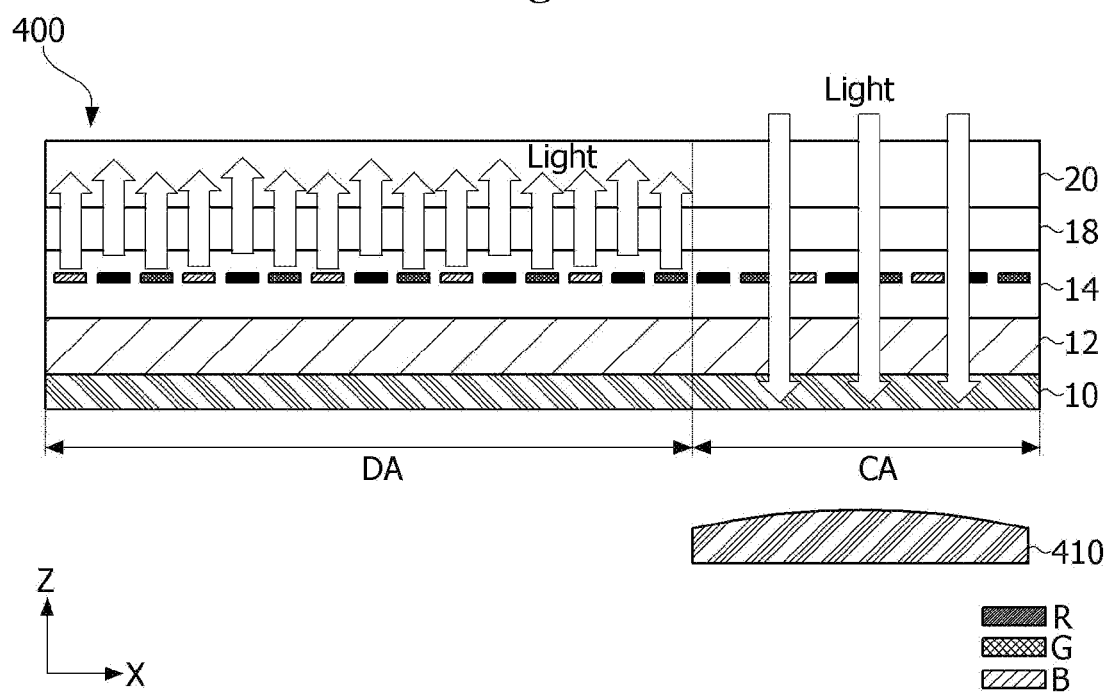
FIG. 11 is a cross-sectional view schematically illustrating a display panel according to an embodiment of the present disclosure.
Figure 12:
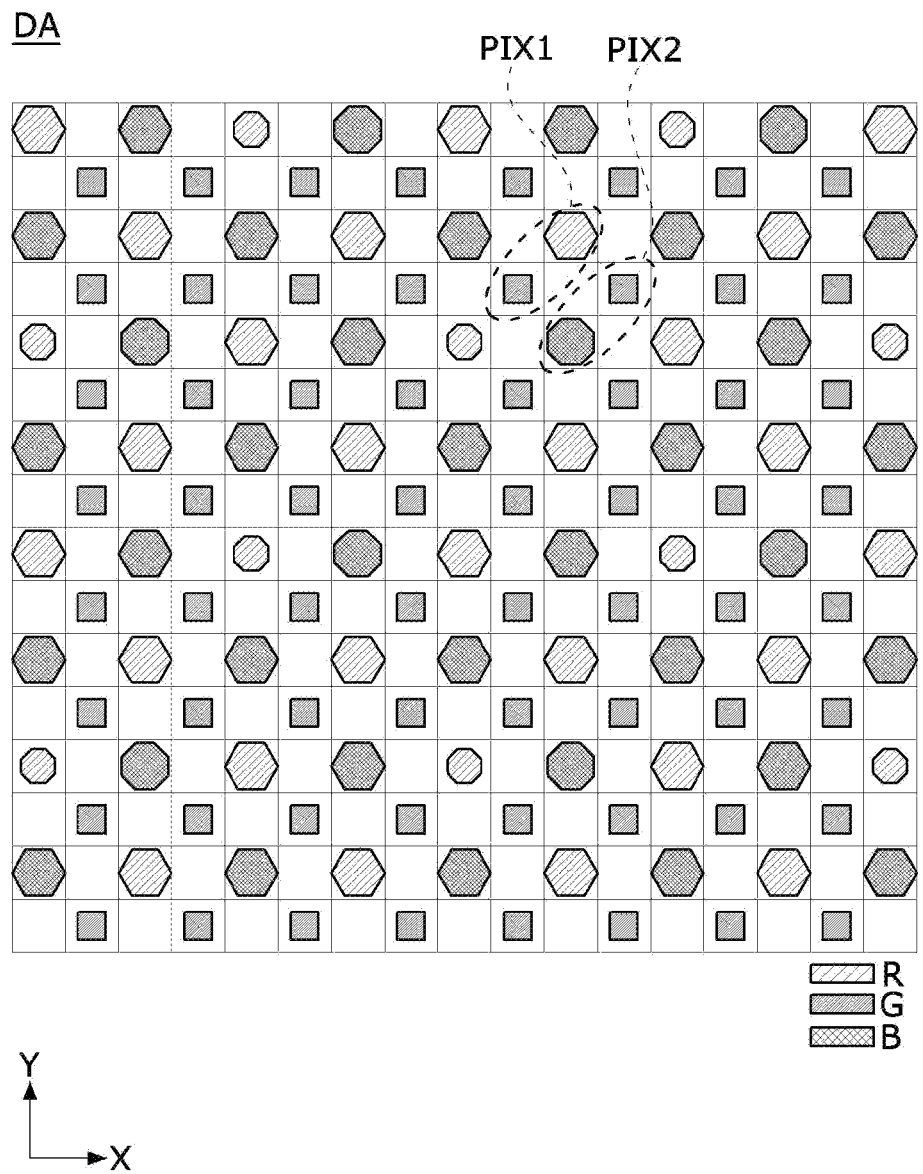
FIG. 12 is a view illustrating pixels arranged in a first display area of a display panel according to one embodiment of the present disclosure.

FIG. 10 is a view illustrating a relation of arrangement between a first display area and a second display area of a display panel and an optical device according to one embodiment of the present disclosure, FIG. 11 is a cross-sectional view schematically illustrating a display panel according to an embodiment of the present disclosure, and FIG. 12 is a view illustrating pixels arranged in a first display area of a display panel according to one embodiment of the present disclosure.

In order to reduce the space occupied by the camera on the display panel, a notch or a punch hole may be included, but it is difficult to implement a full-screen display due to the limited screen size. In the display device according to one embodiment of the present disclosure, the entire front surface (exposure surface) of the display device facing the user may be implemented as a display area for displaying an image. Accordingly, the display device may implement a full-screen display on the entire exposure surface. In this case, the optical device 410 disposed on the rear side opposite to the exposure surface may include an image sensor (or camera), a proximity sensor, a white light lighting device, an optical device for face recognition, and the like.

Referring to FIG. 10, the display area may include a first display area DA and a second display area CA. Here, both the first display area DA and the second display area CA may output images, but at different resolutions.

Illustratively, the resolution of the plurality of second pixels disposed in the second display area CA may be lower than the resolution of the plurality of first pixels disposed in the first display area DA. A sufficient amount of light, corresponding to the extent that the resolution of the plurality of second pixels disposed in the second display area CA is lowered, may be injected into the sensors 411 and 412 disposed in the second display area CA. However, it is not necessarily limited to this, and if the second display area CA has sufficient light transmittance or an appropriate noise compensation algorithm may be implemented, the resolution of the first display area DA and the resolution of the second display area CA are may be the same.

The second display area CA may be an area where the sensors 411 and 412 are located. Since the second display area CA is an area overlapped with various sensors, it may have a smaller area than the first display area DA, which outputs most of the images.

The sensors 411 and 412 may include at least one of an image sensor, a proximity sensor, an illuminance sensor, a gesture sensor, a motion sensor, a fingerprint recognition sensor, and a biometric sensor. Illustratively, the first sensor 411 may be an infrared sensor, and the second sensor 412 may be, but is not necessarily limited to, an image sensor for capturing images or videos.

The second display area CA may be disposed at various locations where light is incident. Illustratively, the second display area CA may be disposed on the upper left side of the display area. In addition, the second display area CA may be disposed on the upper right side of the display area. Further, the second display area CA may be entirely disposed on the top of the display area. In addition, the width of the second display area CA may be variously modified. Furthermore, the second display area CA may be disposed in the center or at the lower end portion of the display area.

Hereinafter, the first display area DA may be described as a display area, and the second display area CA may be described as an imaging area.

Referring to FIGS. 11 and 12, the display area DA and the imaging area CA may include a pixel array in which pixels into which pixel data is written are arranged. The number of pixels per inch (PPI) of the imaging area CA may be lower than that of the display area DA in order to ensure light transmittance of the imaging area CA.

The pixel array of the display area DA may include a pixel area (a first pixel area) in which a plurality of pixels having a high PPI are disposed. Further, the pixel array of the imaging area CA may include a pixel area (a second pixel area) in which a plurality of pixel groups spaced apart by a light-transmitting area and having a relatively low PPI are disposed. In the imaging area CA, external light may pass through the display panel 400 through a light-transmitting area having high light transmittance to be received by a sensor under the display panel 400.

Since both the display area DA and the imaging area CA include pixels, an input image may be reproduced on the display area DA and the imaging area CA.

Each of the pixels of the display area DA and the imaging area CA may include sub-pixels having different colors in order to implement color of an image. The sub-pixels may include a red sub-pixel, a green sub-pixel, and/or a blue sub-pixel. Although not shown, each of the pixels P may further include a white sub-pixel (hereinafter referred to as "W sub-pixel"). Further, each of the sub-pixels may include a pixel circuit and a light emitting element (OLED). Here, the sub-pixels may be referred to as a first sub-pixel, a second sub-pixel, a third sub-pixel, and the like.

The imaging area CA may include pixels, and the pixels may display an input image by writing pixel data of an input image in the display mode. In this case, since the optical devices 410 are disposed under the rear surface of the display panel 400 so as to overlap with the imaging area CA, the display area of the screen is not limited by the optical devices 410. Therefore, the display device of the present disclosure may implement a full-screen display by enlarging the display area of the screen, and may increase the degree of freedom in screen design.

A camera module may be provided as the optical device 410, and the camera module may capture an external image in an imaging mode and output photo or video image data. A lens of the camera module may face the imaging area CA. Further, external light may be incident to a lens of the camera module through the imaging area CA, and the lens may condense light onto an image sensor omitted from the drawings. Accordingly, the camera module may output photo or video image data by capturing an external image in the imaging mode.

In addition, the camera module provided as the optical device 410 may be an infrared camera including an infrared sensor 411. Here, the infrared camera captures dot beams of infrared wavelengths focused on a person's face. Further, the infrared camera may generate facial pattern data by converting light of the infrared wavelengths passing through the display panel 400 into electrical signals and converting them into digital data. Therefore, when the infrared rays irradiated from the infrared lighting device are irradiated to the user's face and the infrared rays reflected from the face are received by the infrared camera, a biometric authentication module of a host system processes the user's authentication.

In this case, the infrared lighting device may enable face recognition even in a dark environment by using a flood illuminator that generates an infrared (IR) flash.

Meanwhile, some pixels may be removed from the imaging area CA compared to the display area DA to ensure light transmittance. Further, a picture quality compensation algorithm for compensating for the luminance and color coordinates of the pixels disposed in the imaging area CA due to the removed pixels may be applied to the display device.

In the present disclosure, low-resolution pixels may be disposed in the imaging area CA. Therefore, since the display area of the screen is not limited by the camera module, a full-screen display may be implemented.

The display panel 400 may be formed in a hexahedral shape having a length in the X-axis direction, a width in the Y-axis direction, and a thickness in the Z-axis direction. Here, the width and length of the display panel 400 may be set to various design values depending on the application field of the display device.

The display panel 400 may include a circuit layer 12 disposed on a substrate 10 and a light emitting element layer 14 disposed on the circuit layer 12. In addition, the display panel 400 may include an encapsulation layer 16 disposed on the light emitting element layer 14, a touch sensor layer 18 formed on the encapsulation layer 16, and a color filter layer 20 disposed on the touch sensor layer 18.

The substrate 10 may be formed of an insulating material or a material having flexibility. For example, the substrate 10 may be formed of glass, metal, plastic, or the like, but is not limited thereto.

The circuit layer 12 may include a pixel circuit connected to wires such as data lines, gate lines, and power lines, and a gate driving part or the like connected to the gate lines. Further, the circuit layer 12 may include circuit elements such as transistors and capacitors implemented with thin film transistors (TFTs). Here, the wires and circuit elements of the circuit layer 12 may be implemented with a plurality of insulating layers, two or more metal layers separated with the insulating layer interposed therebetween, and an active layer including a semiconductor material.

The light emitting element layer 14 may include a light emitting element driven by the pixel circuit. Here, the light emitting element may be implemented as an organic light emitting diode (OLED). The OLED may include an organic compound layer formed between an anode and a cathode. The organic compound layer may include a hole injection layer (HIL), a hole transport layer (HTL), an emission layer (EML), an electron transport layer (ETL), and an electron injection layer (EIL), but is not limited thereto. When voltage is applied to the anode and cathode of the OLED, holes passing through the hole transport layer (HTL) and electrons passing through the electron transport layer (ETL) are moved to the emission layer (EML) to form excitons, and as a result, the visible light is emitted from the emission layer (EML).

The light emitting element layer 14 may further include a color filter array disposed on the pixels to selectively transmit red, green, and blue wavelengths.

The light emitting element layer 14 may be covered by a protective film, and the protective film may be covered by an encapsulation layer. Here, the protective film may have a structure in which organic films and inorganic films are alternately stacked. In this case, the inorganic film may block penetration of moisture or oxygen. In addition, the organic film may planarize the surface of the inorganic film. When the organic film and the inorganic film are stacked in multiple layers, the movement path of moisture or oxygen is longer than that of a single layer, so that the penetration of moisture/oxygen affecting the light emitting element layer 14 may be effectively blocked.

The encapsulation layer 16 covers the light emitting element layer 14 so as to seal the circuit layer 12 and the light emitting element layer 14. Here, the encapsulation layer 16 may have a multi-insulation layer structure in which organic films and inorganic films are alternately stacked. In this case, the inorganic film blocks penetration of moisture or oxygen. In addition, the organic film planarizes the surface of the inorganic layer. When the organic film and the inorganic film are stacked in multiple layers, the movement path of moisture or oxygen is longer than that of a single layer, so that the penetration of moisture/oxygen affecting the light emitting element layer 16 may be effectively blocked.

The touch sensor layer 18 may include capacitive touch sensors that sense a touch input based on a change in capacitance before and after the touch input. The touch sensor layer 18 may include metal wiring patterns and insulating layers forming capacitance of the touch sensors. The insulating layers may insulate portions where the metal wiring patterns intersect and planarize a surface of the touch sensor layer.

A polarizing plate omitted in the drawings may be adhered on the touch sensor layer 18. The polarizing plate may convert polarization of external light reflected by the metal patterns of the circuit layer 12 to improve visibility and contrast ratio. Here, the polarizing plate may be implemented as a polarizing plate in which a linear polarizing plate and a phase retardation film are bonded together or a circular polarizing plate. Further, a cover glass omitted in the drawings may be adhered on the polarizing plate.

The color filter layer 20 may be formed on the touch sensor layer 18.

The color filter layer 20 may include red, green, and blue color filters. In addition, the color filter layer 20 may further include a black matrix pattern. The color filter layer 20 may absorb some wavelengths of light reflected from the circuit layer 12 to replace the role of a polarizing plate and increase color purity. In this embodiment, the color filter layer 20 having higher light transmittance than that of the polarizing plate may be applied to the display panel 400 to improve the light transmittance of the display panel 400 and to improve the thickness and flexibility of the display panel 400. A cover glass omitted in the drawings may be adhered on the color filter layer 20.

The color filter layer 20 may include an organic film covering the color filter and the black matrix pattern. An extended portion of the organic film may cover the remaining inorganic film or the substrate 10 in the bezel area, that is, the edge area of the display panel 400.

Referring to FIG. 12, the display area DA may include unit pixels PIX1 and PIX2 arranged in a matrix form. Each of the unit pixels PIX1 and PIX2 may be implemented as a real-type pixel in which red, green, and blue sub-pixels of three primary colors are constituted as one pixel. Here, a first pixel and a second pixel disposed in the display area may be formed by combining the unit pixels PIX1 and PIX2.

Each of the unit pixels PIX1 and PIX2 may further include a W sub-pixel omitted in the drawings. In addition, two sub-pixels may be configured as one pixel by using a sub-pixel rendering algorithm. For example, the first unit pixel PIX1 may be composed of red and green sub-pixels, and the second unit pixel PIX2 may be composed of blue and green sub-pixels. Insufficient color representation in each of the unit pixels PIX1 and PIX2 may be compensated for by an average value of corresponding color data between pixels adjacent to each other.

Figure 13A:
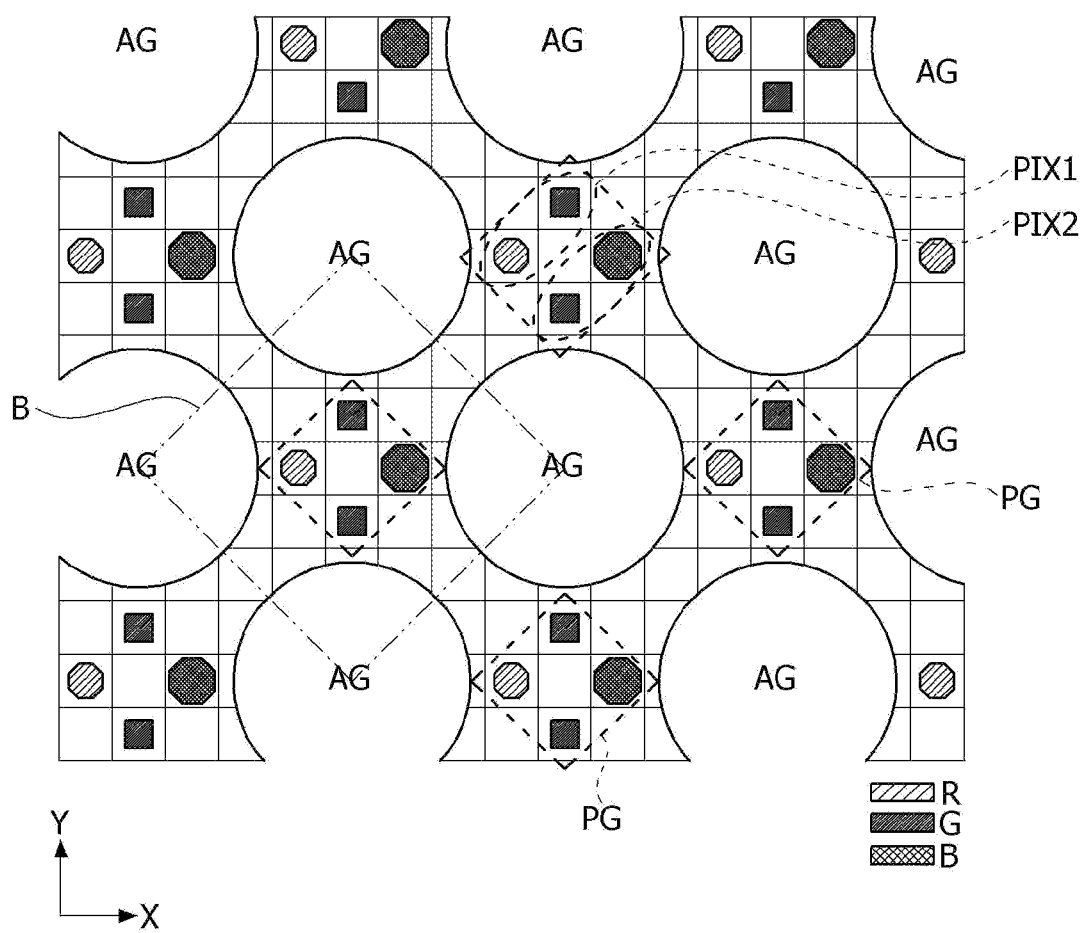
FIG. 13*a* is a view illustrating light-transmitting areas and pixels arranged in a second display area of a display panel according to one embodiment of the present disclosure.
Figure 13B:
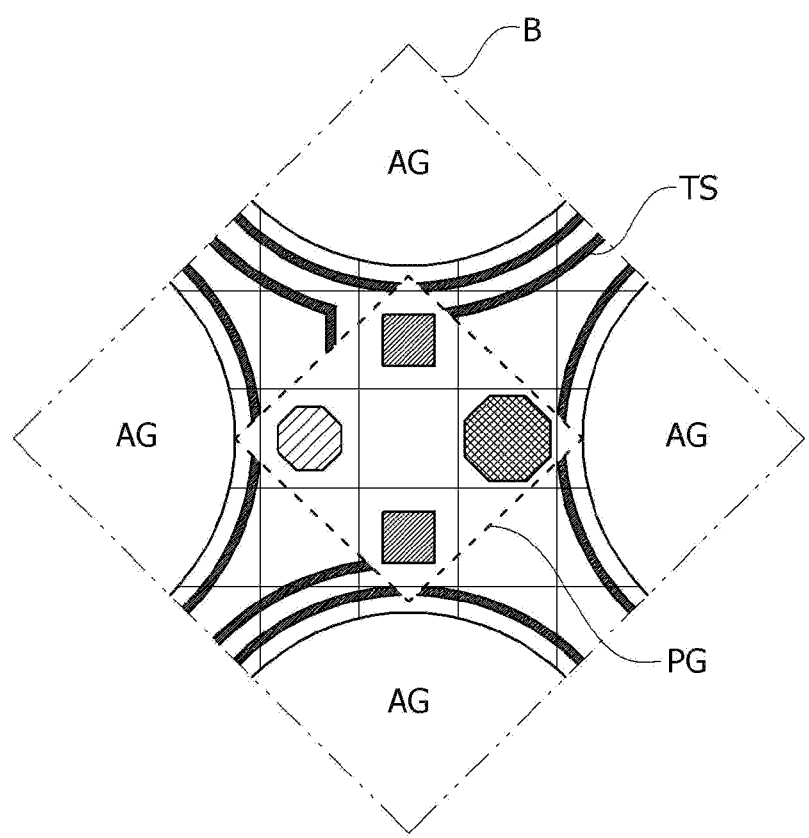
FIG. 13*b* is a partially enlarged view of an area B of FIG. 13*a*.

FIG. 13a is a view illustrating light-transmitting areas and pixels arranged in a second display area of a display panel according to one embodiment of the present disclosure, and FIG. 13b is a partially enlarged view of an area B of FIG. 13a.

Referring to FIG. 13a and FIG. 13b, a plurality of light-transmitting areas AG may be disposed between a plurality of second pixels. In detail, the imaging area CA may include a pixel group PG spaced apart by a predetermined distance and the light-transmitting area AG disposed between pixel groups PG adjacent to each other. The external light may be received by a lens of the camera module through the light-transmitting area AG. The pixel groups PG may be spaced apart from each other within the pixel area.

The light-transmitting area AG may include transparent materials having high light transmittance without metal so that light may be incident with minimal light loss. The light-transmitting area AG may be made of transparent insulating materials without including metal wires or pixels. Accordingly, the light transmittance of the imaging area CA may increase as the light-transmitting area AG is larger.

One or two pixels may be included in the pixel group PG. Each of the pixels of the pixel group may include two to four sub-pixels. For example, one pixel in the pixel group may include red, green, and blue sub-pixels, or two sub-pixels, and may further include a W sub-pixel.

A distance between the light-transmitting areas AG may be smaller than an interval between the pixel groups PG. An interval between sub-pixels may be smaller than an interval between pixel groups PG.

The shape of the light-transmitting area AG is illustrated as circular, but is not limited thereto. For example, the light-transmitting area AG may be designed in various shapes such as a circular shape, an elliptical shape, and a polygonal shape.

All of the metal electrode material in the light-transmitting area AG may be removed. Accordingly, the wirings TS of the pixels may be disposed outside the light-transmitting area AG. Therefore, light may be effectively incident through the light-transmitting area AG. However, it is not necessarily limited thereto, and a metal electrode material may remain in some areas of the light-transmitting area AG.

Figure 14:
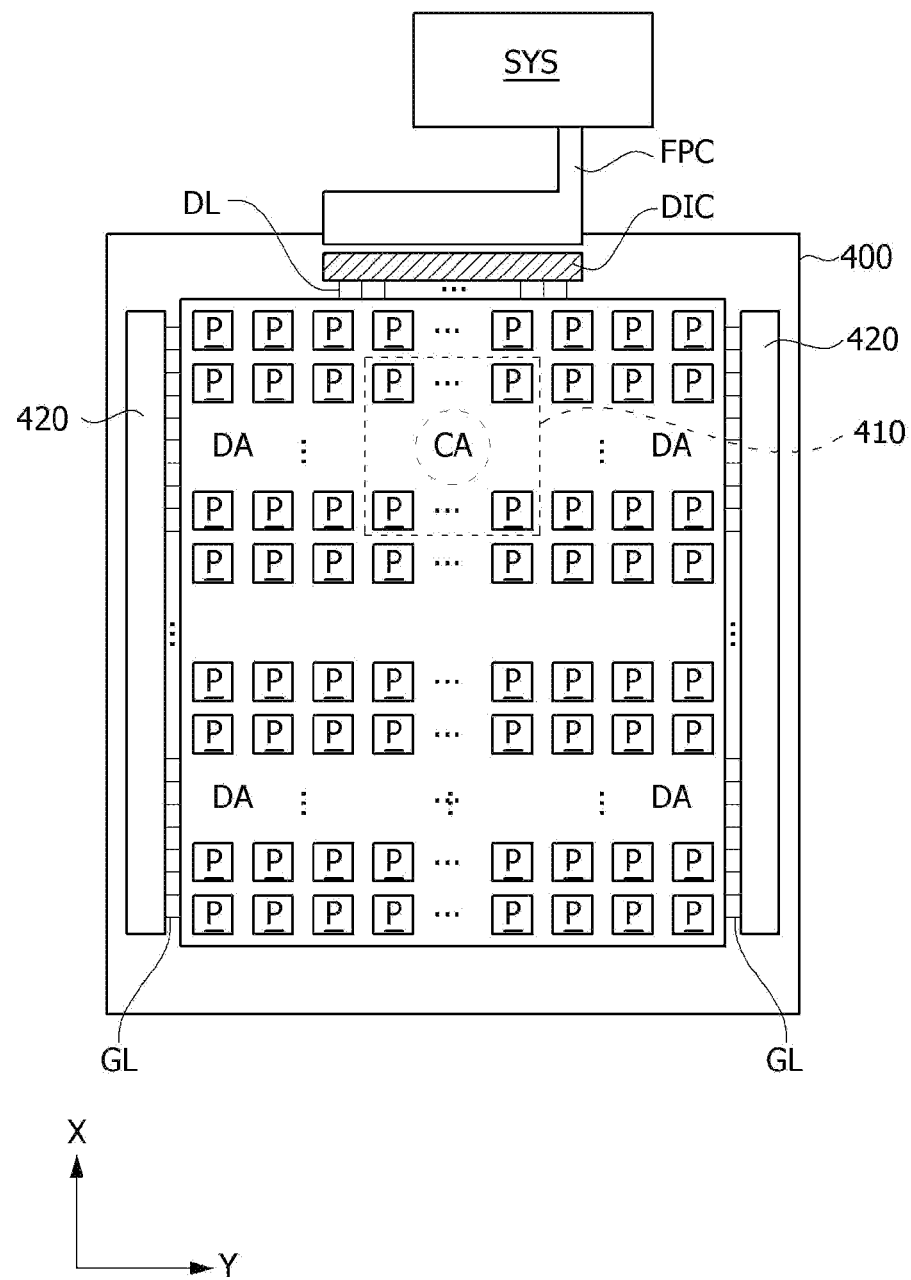
FIG. 14 is a view illustrating a display panel and a display panel driver according to one embodiment of the present disclosure.

FIG. 14 is a view illustrating a display panel and a display panel driver according to one embodiment of the present disclosure.

Referring to FIG. 14, the display device may include a display panel 400 in which a pixel array is disposed on a screen, a display panel driver, and the like.

The pixel array of the display panel 400 may include data lines DL, gate lines GL crossing the data lines DL, and pixels P that are connected to the gate lines GL and the data lines DL and arranged in a matrix form. The pixel array may further include power wires such as the VDD line PL1, the Vini line PL2, the VSS line PL3, and the like shown in FIG. 15.

The pixel array may be divided into the circuit layer 12 and the light emitting element layer 14 as shown in FIG. 11. Further, a touch sensor array may be disposed on the light emitting element layer 14. Here, each of the pixels of the pixel array may include two to four sub-pixels as described above. Each of the sub-pixels may include a pixel circuit disposed in the circuit layer 12.

A screen on which an input image is reproduced on the display panel 400 may include a display area DA and an imaging area CA.

The sub-pixels in each of the display area DA and the imaging area CA may include a pixel circuit. The pixel circuit may include a driving element for supplying current to the light emitting element OLED, a plurality of switch elements for sampling a threshold voltage of the driving element and switching a current path of the pixel circuit, and a capacitor for maintaining the gate voltage of the driving element, and the like. In this case, the pixel circuit may be disposed under the light emitting element.

The imaging area CA may include a light-transmitting area AG disposed between the pixel groups and a camera module disposed under the imaging area CA. The camera module may output image data captured by photo-electrically converting light incident through the imaging area CA in an imaging mode using an image sensor and converting pixel data of an image output from the image sensor into digital data.

The display panel driver may write the pixel data of the input image into the pixels P. The pixels P may be interpreted as a pixel group including a plurality of sub-pixels.

The display panel driver may include a data driving part for supplying data voltages of pixel data to the data lines DL and a gate driving part 420 for sequentially supplying gate pulses to the gate lines GL. Further, the data driving part may be integrated into a drive IC DIC. In addition, the display panel driver may further include a touch sensor driving part omitted in the drawings.

The drive IC DIC may be attached on the display panel 400. The drive IC DIC receives timing signal and pixel data of an input image from the host system SYS, supplies data voltages of the pixel data to pixels, and synchronizes the data driving part and the gate driving part 420.

The drive IC DIC may be connected to the data lines DL through data output channels to supply data voltages of pixel data to the data lines DL. The drive IC DIC may output a gate timing signal for controlling the gate driving part 420 through gate timing signal output channels.

The gate driving part 420 may include a shift register formed in a circuit layer of the display panel 400 together with the pixel circuit. The shift register of the gate driving part 420 may sequentially supply gate signals to the gate lines GL under the control of the timing controller. The gate signal may include a scan pulse and an EM pulse of a light emitting signal.

The host system SYS may be implemented as an application processor (AP). The host system SYS may transmit pixel data of an input image to the drive IC DIC through a mobile industry processor interface (MIPI). The host system SYS may be connected to the drive IC DIC, for example, through a flexible printed circuit FPC.

Meanwhile, the display panel 400 may be implemented as a flexible panel applicable to a flexible display.

The flexible panel may be manufactured with so-called "plastic OLED panel". The plastic OLED panel may include a back plate and a pixel array on an organic thin film bonded on the back plate. A touch sensor array may be formed on the pixel array.

The back plate may be a polyethylene terephthalate (PET) substrate. The pixel array and the touch sensor array may be formed on the organic thin film. The back plate may block moisture permeation toward the organic thin film so that the pixel array is not exposed to humidity.

The organic thin film may be a polyimide (PI) substrate. A multi-layered buffer film may be formed of an insulating material (not shown) on the organic thin film. And the circuit layer 12 and the light emitting element layer 14 may be stacked on the organic thin film.

In the display device of the present disclosure, the pixel circuit and the gate driving part disposed in the circuit layer 12 may include a plurality of transistors. The transistors may be implemented as an oxide thin film transistor (TFT) including an oxide semiconductor, a low temperature poly silicon (LTPS) TFT including LTPS, or the like. In addition, each of the transistors may be implemented as a p-channel TFT or an n-channel TFT.

The transistor is a three-electrode element including a gate, a source, and a drain. The source is an electrode that supplies carriers to the transistor. In the transistor, the carriers may start flowing from the source. The drain is an electrode through which the carriers exit from the transistor.

In the transistor, the carriers flows from the source to the drain. In the case of an n-channel transistor, since the carriers are electrons, a source voltage is lower than a drain voltage so that the electrons can flow from the source to the drain. In the n-channel transistor, a current flows from the drain to the source.

In the case of a p-channel transistor (PMOS), since the carriers are holes, the source voltage is higher than the drain voltage so that the holes can flow from the source to the drain. In the p-channel transistor, since the holes flow from the source to the drain, a current flows from the source to the drain. It should be noted that the source and drain of the transistor are not fixed. For example, the source and the drain may be changed according to an applied voltage. Therefore, the present disclosure is not limited due to the source and drain of the transistor. In the following description, the source and drain of the transistor may be referred to as first and second electrodes.

The gate pulse may swing between the gate-on voltage and the gate-off voltage. The gate-on voltage may be set to a voltage higher than the threshold voltage of the transistor, and the gate-off voltage is set to a voltage lower than the threshold voltage of the transistor.

The transistor may be turned on in response to the gate-on voltage, while it is turned off in response to the gate-off voltage. In the case of the n-channel transistor, the gate-on voltage may be a gate high voltage VGH, and the gate-off voltage may be a gate low voltage VGL. In the case of the p-channel transistor, the gate-on voltage may be the gate low voltage VGL, and the gate-off voltage may be the gate high voltage VGH.

The driving element of the pixel circuit may be implemented with a transistor. The electrical properties of the driving element needs to be uniform among all pixels, but the electrical properties may differ between pixels due to process deviation and element properties deviation, and may change over the lapse of driving time of the display.

In order to compensate for such a deviation in the electrical properties of the driving element, the display device may include an internal compensation circuit and an external compensation circuit. The internal compensation circuit may be added to the pixel circuit in each of the sub-pixels and sample a threshold voltage Vth and/or a mobility u of the driving element, which varies depending on the electrical properties of the driving element, and compensate the variation in real time.

The external compensation circuit may transmit the threshold voltage and/or mobility of the driving element sensed through a sensing line connected to each of the sub-pixels to an external compensation unit. The compensation unit of the external compensation circuit may reflect the sensed result to modulate the pixel data of the input image, thereby compensating for the variation in the electrical properties of the driving element.

A pixel voltage that varies depending on electrical properties of an external compensation driving element may be sensed, and the data of the input image may be modulated in an external circuit based on the sensed voltage, thereby compensating for a deviation in the electrical properties of the driving element between pixels.

Figure 15:
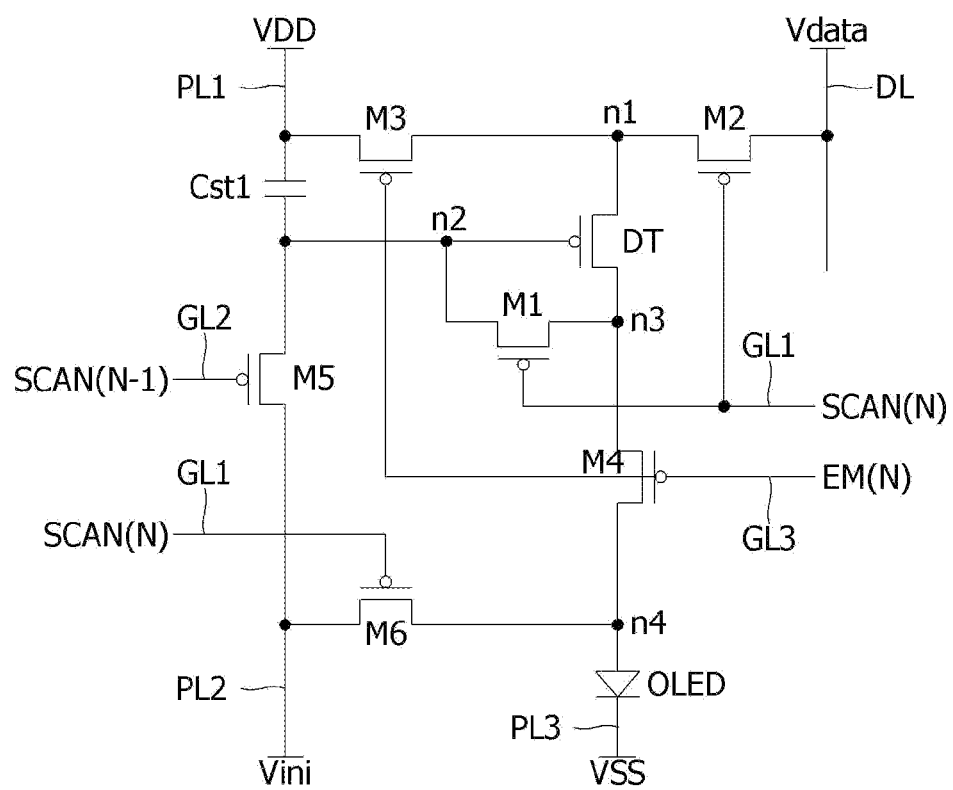
FIG. 15 is a circuit diagram illustrating one example of a pixel circuit.

FIG. 15 is a circuit diagram illustrating one example of a pixel circuit.

The pixel circuit illustrated in FIG. 15 may be equally applied to the pixel circuit of the display area DA and the imaging area CA.

Referring to FIG. 15, the pixel circuit may include a light emitting element OLED, a driving element DT for supplying current to the light emitting element OLED, and an internal compensation circuit for sampling the threshold voltage Vth of the driving element DT and compensating for the gate voltage of the driving element DT by the threshold voltage Vth of the driving element DT using a plurality of switch elements M1 to M6. Each of the driving element DT and the switch elements M1 to M6 may be implemented as a p-channel TFT.

The light emitting element OLED may include an organic compound layer formed between an anode and a cathode. The organic compound layer may include, but is not limited to, a hole injection layer, a hole transport layer, a light emitting layer, an electron transport layer, an electron injection layer, and the like.

The anode electrode of the light emitting element OLED may be connected to a fourth node n4 between the fourth and sixth switch elements M4 and M6. The fourth node n4 may be connected to the anode of the light emitting element OLED, a second electrode of the fourth switch element M4, and a second electrode of the sixth switch element M6. The cathode electrode of the light emitting element OLED may be connected to VSS line PL3 to which the low potential power supply voltage VSS is applied. The light emitting element OLED may emit light with the current Ids flowing depending on the gate-source voltage Vgs of the driving element DT. A current path of the light emitting element OLED may be switched by the third and fourth switch elements M3 and M4.

A storage capacitor Cst1 may be connected between the VDD line PL1 and the first node n1. A data voltage Vdata compensated for by the threshold voltage Vth of the driving element DT may be charged in the storage capacitor Cst1. Since the data voltage Vdata in each of the sub-pixels is compensated for by the threshold voltage Vth of the driving element DT, a characteristic deviation of the driving element DT in the sub-pixels may be compensated for.

The first switch element M1 may be turned on in response to a gate-on voltage VGL of an Nth scan pulse SCAN(N) to connect the second node n2 and the third node n3. The second node n2 may be connected to a gate electrode of the driving element DT, a first electrode of the storage capacitor Cst1, and a first electrode of the first switch element M1. The third node n3 may be connected to the second electrode of the driving element DT, the second electrode of the first switch element M1, and a first electrode of the fourth switch element M4. The gate electrode of the first switch element M1 is connected to a first gate line GL1 to receive the Nth scan pulse SCAN(N). The first electrode of the first switch element M1 may be connected to the second node n2, and the second electrode of the first switch element M1 may be connected to the third node n3.

The first switch element M1 is turned on only during one very short horizontal period (1H) in which the Nth scan pulse SCAN(N) is generated as the gate-on voltage VGL in one frame period and maintains the off state for approximately one frame period. For this reason, leakage current may be generated in the off state of the first switch element M1.

The second switch element M2 may be turned on in response to the gate-on voltage VGL of the N-th scan pulse SCAN(N) to supply the data voltage Vdata to the first node n1. The gate electrode of the second switch element M2 is connected to the first gate line GL1 to receive the Nth scan pulse SCAN(N). A first electrode of the second switch element M2 may be connected to the first node n1. The second electrode of the second switch element M2 may be connected to the data line DL to which the data voltage Vdata is applied. The first node n1 may be connected to the first electrode of the second switch element M2, the second electrode of the third switch element M2, and the first electrode of the driving element DT.

The third switch element M3 may be turned on in response to the gate-on voltage VGL of the light emitting signal EM(N) to connect the VDD line PL1 to the first node n1. The gate electrode of the third switch element M3 may be connected to the third gate line GL3 to receive the light emitting signal EM(N). A first electrode of the third switch element M3 may be connected to the VDD line PL1. A second electrode of the third switch element M3 may be connected to the first node n1.

The fourth switch element M4 may be turned on in response to the gate-on voltage VGL of the light emitting signal EM(N) to connect the third node n3 to the anode of the light emitting element OLED. The gate electrode of the fourth switch element M4 is connected to the third gate line GL3 to receive the light emitting signal EM(N). The first electrode of the fourth switch element M4 may be connected to the third node n3, and the second electrode thereof may be connected to the fourth node n4.

The fifth switch element M5 may be turned on in response to the gate-on voltage VGL of the N−1th scan pulse SCAN (N−1) to connect the second node n2 to the Vini line PL2. The gate electrode of the fifth switch element M5 is connected to the second gate line GL2 to receive the N−1th scan pulse SCAN(N−1). The first electrode of the fifth switch element M5 may be connected to the second node n2, and the second electrode thereof may be connected to the Vini line PL2.

The sixth switch element M6 may be turned on in response to the gate-on voltage VGL of the Nth scan pulse SCAN(N) to connect the Vini line PL2 to the fourth node n4. The gate electrode of the sixth switch element M6 is connected to the first gate line GL1 to receive the Nth scan pulse SCAN(N). A first electrode of the sixth switch element M6 may be connected to the Vini line PL2, and a second electrode thereof may be connected to the fourth node n4.

The driving element DT may drive the light emitting element OLED by adjusting the current Ids flowing through the light emitting element OLED depending on the gate-source voltage Vgs. The driving element DT may include a gate connected to the second node n2, a first electrode connected to the first node n1, and a second electrode connected to the third node n3.

Figure 16:
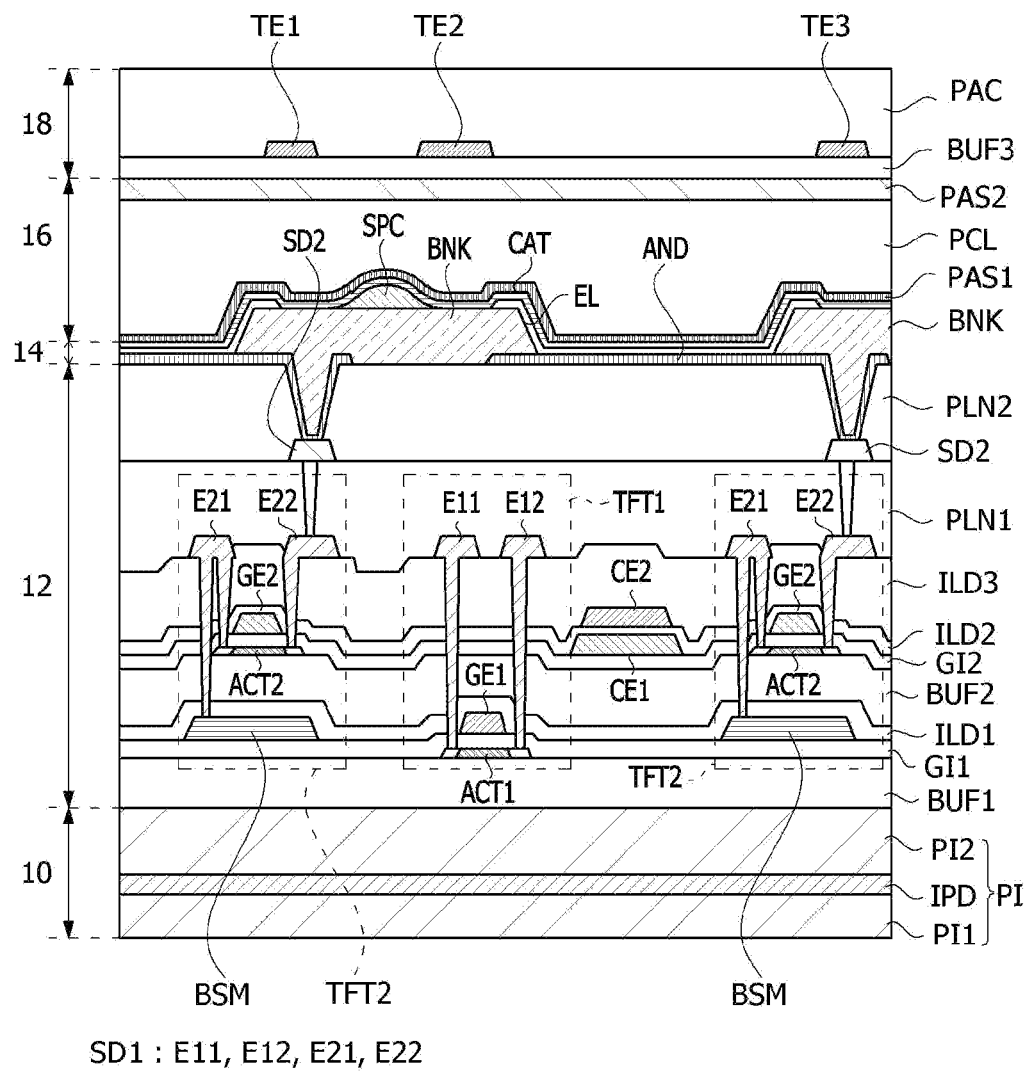
FIG. 16 is a cross-sectional view illustrating in detail a cross-sectional structure of a pixel area disposed in a first display area in a display panel according to one embodiment of the present disclosure.
Figure 17:
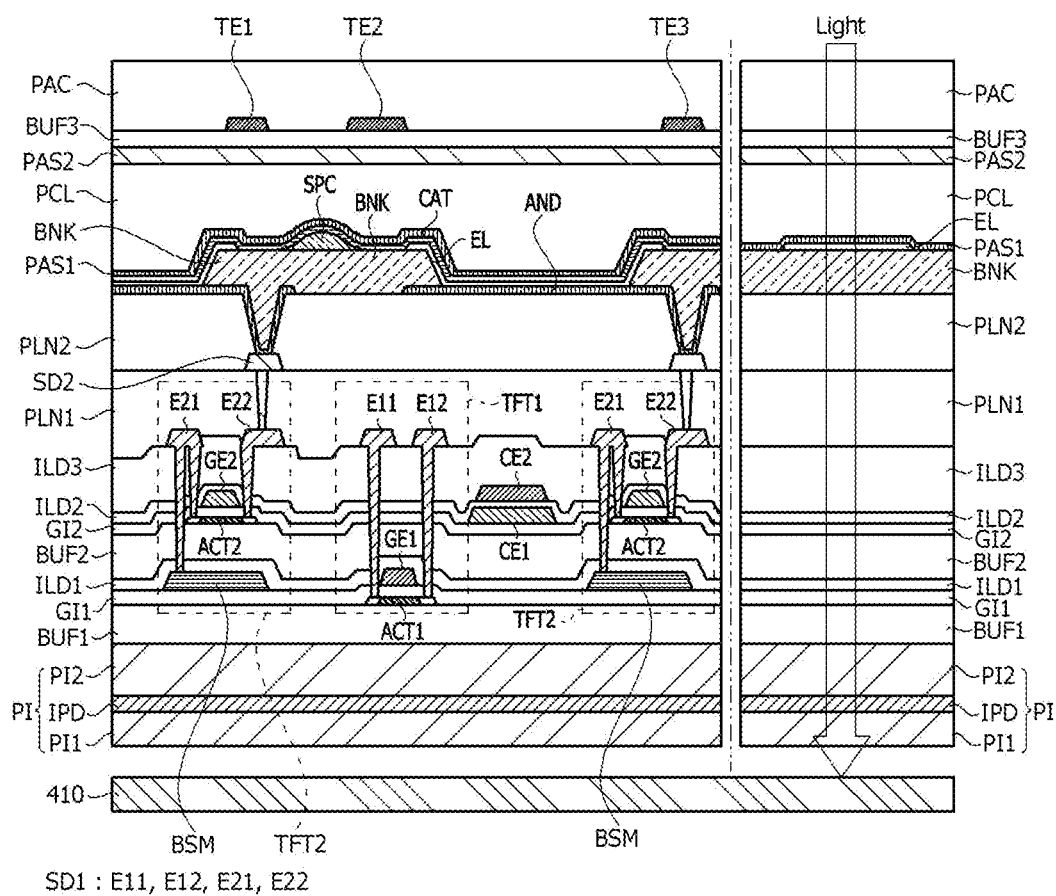
FIG. 17 is a cross-sectional view illustrating in detail a cross-sectional structure of a pixel area and a light-transmitting area disposed in a second display area in a display device according to one embodiment of the present disclosure.

FIG. 16 is a cross-sectional view illustrating in detail a cross-sectional structure of a pixel area disposed in a first display area in a display panel according to one embodiment of the present disclosure, and FIG. 17 is a cross-sectional view illustrating in detail a cross-sectional structure of a pixel area and a light-transmitting area disposed in a second display area in a display device according to one embodiment of the present disclosure. Here, it should be noted that the cross-sectional structure of the pixel area is not limited to that of FIG. 16. In FIG. 16, TFT represents the driving element DT of the pixel circuit. Specifically, "TFT1" is a first TFT that is one of LTPS TFTs disposed in the display area, and "TFT2" is a second TFT that is one of oxide TFTs disposed in the display area.

Referring to FIG. 16, a plurality of sub-pixel circuits and wires connected to the pixel circuits are disposed in the display area DA of the display panel 400. Here, the pixel circuits in the display area include a pixel circuit of a red sub-pixel for driving a red light emitting element, a pixel circuit of a green sub-pixel for driving a green light emitting element, and a pixel circuit of a blue sub-pixel for driving a blue light emitting element. Further, the display area may be separated into a plurality of circuit areas along the X-axis direction of the display panel 400.

A substrate PI may include first and second substrates PI1 and PI2. Further, an inorganic film IPD may be formed between the first substrate PI1 and the second substrate PI2. In this case, the inorganic film IPD blocks moisture permeation. Here, since the substrate PI may be formed of polyimide, it may be referred to as a PI substrate, and the first and second substrates PI1 and PI2 may be referred to as first and second PI substrates.

A first buffer layer BUF1 may be formed on the second substrate PI2. The first buffer layer BUF1 may be formed of a multi-layered insulating layer in which two or more oxide layers $SiO_2$ and nitride layers SiNx are stacked. A first semiconductor layer is formed on the first buffer layer BUF1. The first semiconductor layer may include a polysilicon semiconductor layer patterned in a photolithography process. The first semiconductor layer may include a polysilicon active pattern ACT1 forming a semiconductor channel in the first TFT TFT1.

A first gate insulating layer GI1 is deposited on the first buffer layer BUF1 to cover the active pattern ACT1 of the first semiconductor layer. The first gate insulating layer GI1 includes an inorganic insulating material layer. A first metal layer is formed on the first gate insulating layer GI1. The first metal layer is insulated from the first semiconductor layer by the first gate insulating layer GI1.

The first metal layer includes a single metal layer patterned in a photolithography process or metal patterns in which two or more metal layers are stacked. The first metal layer may include a gate electrode GE1 of the first TFT TFT1 and a light shield pattern BSM under the second TFT TFT2.

A first interlayer insulating layer ILD1 is formed on the first gate insulating layer GI1 to cover the patterns of the first metal layer. The first interlayer insulating layer ILD1 includes an inorganic insulating material. A second buffer layer BUF2 is formed on the first interlayer insulating layer ILD1. The second buffer layer BUF2 includes a single layer or a multi-layer inorganic insulating material.

The second semiconductor layer includes an oxide semiconductor pattern ACT2 forming a semiconductor channel in the second TFT TFT2. The second gate insulating layer GI2 is deposited on the second buffer layer BUF2 to cover the active pattern ACT2 of the second semiconductor layer. The second gate insulating layer GI2 includes a single layer or multi-layered inorganic insulating material. A second metal layer is formed on the second gate insulating layer GI2. The second metal layer is insulated from the second semiconductor layer by the second gate insulating layer GI2.

The second metal layer includes a single metal layer patterned in a photolithography process or metal patterns in which two or more metal layers are stacked. The second metal layer includes a gate electrode GE2 of the second TFT TFT2 and a lower capacitor electrode CE1.

A second interlayer insulating layer ILD2 is formed on the second gate insulating layer GI2 to cover the patterns of the second metal layer. The second interlayer insulating layer ILD2 includes a single layer or a multi-layer inorganic insulating material. A third metal layer is formed on the second interlayer insulating layer ILD2. The third metal layer is insulated from the second metal layer by the second interlayer insulating layer ILD2.

The third metal layer includes a single metal layer patterned in a photolithography process or metal patterns in which two or more metal layers are stacked. The third metal layer includes an upper capacitor electrode CE2. The capacitor Cst of the pixel circuit is composed of the upper capacitor electrode CE2, the lower capacitor electrode CE1, and a dielectric layer therebetween, that is, the second interlayer insulating layer ILD2.

A third interlayer insulating layer ILD3 covering the patterns of the third metal layer is formed on the second interlayer insulating layer ILD2. The third interlayer insulating layer ILD3 includes a single layer or a multi-layer inorganic insulating material. A fourth metal layer is formed on the third interlayer insulating layer ILD3. The fourth metal layer is insulated from the second semiconductor layer by the second gate insulating layer GI2.

A fourth metal layer SD1 includes a single metal layer patterned in a photolithography process or metal patterns in which two or more metal layers are stacked. The fourth metal layer includes first and second electrodes E11 and E12 of the first TFT TFT1 and first and second electrodes E21 and E22 of the second TFT TFT2. The first and second electrodes E11 and E12 of the first TFT TFT1 is connected to a first active pattern ACT1 through a first contact hole passing through the insulating layers GI1, ILD1, BUF2, GI2, ILD2 and ILD3. The first and second electrodes E21 and E22 of the second TFT TFT2 are connected to the second active pattern ACT2 through a second contact hole passing through the insulating layers GI2, ILD2 and ILD3. A first electrode E21 of the second TFT TFT2 may be connected to the light shield pattern BSM through a third contact hole passing through the insulating layers ILD1, BUF2, GI2, ILD2 and ILD3. Here, a strong electric field may be generated in the metal patterns E11 to E22 of the fourth metal layer due to voltages swinging between a gate-on voltage and a gate-off voltage with a large voltage difference.

A first planarization layer PLN1 covers the patterns E11 to E22 of the fourth metal layer. The first planarization layer PLN1 thickly covers the display area DA of the circuit layer 12 with an organic insulating material. When the first planarization layer PLN1 is applied on the circuit layer 12, the organic insulating material flows to the edge of the display panel 400 and covers the side surface of the circuit layer 12 in the bezel area BZ.

A fifth metal layer is formed on the first planarization layer PLN1. The fifth metal layer is insulated from the fourth metal layer by the first planarization layer PLN1. The fifth metal layer includes a single metal layer patterned in a photolithography process or metal patterns in which two or more metal layers are stacked. The fifth metal layer includes a metal pattern SD2 connecting the light emitting element to the second TFT TFT2. The metal pattern SD2 is connected to the second electrode E22 of the second TFT TFT2 through a fourth contact hole penetrating the first planarization layer PLN1.

A second planarization layer PLN2 is formed on the first planarization layer PLN1 to cover the metal patterns of the fifth metal layer. The second planarization layer PLN2 thickly covers the display area DA of the circuit layer 12 with an organic insulating material. A sixth metal layer is formed on the second planarization layer PLN2. The second planarization layer PLN2 planarizes the surface on which the sixth metal layer is formed.

The sixth metal layer includes a single metal layer patterned in a photolithography process or metal patterns in which two or more metal layers are stacked. The pattern of the sixth metal layer includes an anode electrode AND of the light emitting element. The anode electrode AND is in contact with the metal pattern SD2 connected to the second TFT TFT2 of the pixel circuits through the fifth contact hole penetrating the second planarization layer PLN2.

In the light emitting element layer 14, a bank BNK is formed on the second planarization layer PLN2 to cover the edge of the anode electrode AND. In this case, the bank BNK is formed in a pattern that divides a light emitting area (or an opening area) through which light passes from each pixel to the outside. Accordingly, the bank BNK may be referred to as a pixel defining layer. The bank BNK may be patterned in a photolithography process by including an organic insulating material having photosensitivity. Further, a spacer SPC having a predetermined height may be formed on the bank BNK. In this case, the bank BNK and the spacer SPC may be integrated with the same organic insulating material. Further, the spacer SPC secures a gap between a fine metal mask (FMM) and the anode electrode AND so that the FMM is not in contact with the anode electrode AND during a deposition process of the light emitting element formed of an organic compound.

A seventh metal layer used as a cathode electrode CAT of the light emitting element is formed on the bank BNK and an organic compound layer EL. The seventh metal layer is connected between sub-pixels in the display area DA. Here, the organic compound layer EL may be referred to as a light emitting layer or an electroluminescent layer.

The encapsulation layer 16 includes multiple insulating layers covering the cathode electrode CAT of the light emitting element. The multiple insulating layers include a first inorganic insulating layer PAS1 covering the cathode electrode CAT, a thick organic insulating layer PCL covering the first inorganic insulating layer PAS1, and a second inorganic insulating layer PAS2 covering the organic insulating layer PCL.

The touch sensor layer 18 includes a third buffer layer BUF3 covering the second inorganic insulating layer PAS2, sensor electrode wires TE1 to TE3 formed on the third buffer layer BUF3, and an organic insulating layer PAC covering the sensor electrode wires TE1 to TE3.

Referring to FIG. 17, the second display area may include a pixel area and a light-transmitting area. Further, the pixel area of the second display area may have the same structure as the pixel area shown in FIG. 16, but is not necessarily limited thereto.

The light-transmitting area AG may include transparent media having high light transmittance without metal so that light may be incident with minimal light loss. The light-transmitting area AG may be formed of transparent insulating materials without including metal wires or pixels. For example, the metal wires such as the anode electrode AND and the cathode electrode CAT may not be disposed in the light-transmitting area AG compared to the pixel area. Further, the organic compound layer EL may be disposed in the light-transmitting area AG.

The first roll belt 500A and the second roll belt 500B disposed on one area of the rear surface of the display panel 400 may be formed in a two-division structure, and may be supported by the middle support 230 disposed between the first roll belt 500A and the second roll belt 500B, and the side wall 220. In detail, since the first protrusions 520A and 520B, which is an end portion of one side of each of the first roll belt 500A and the second roll belt 500B, are supported by the middle support 230, and the second protrusions 530A and 530B, which is an end portion of the other side, are supported by the sidewalls 220A and 220B, it is possible to suppress a problem in which the creasing or lifting phenomenon is intensified in the display panel 400. Here, as an example, the display device according to one embodiment of the present disclosure uses a roll belt having a two-division structure disposed to be spaced apart from each other in the width direction, but is not necessarily limited thereto. For example, it is possible to further suppress a problem in which the creasing or lifting phenomenon is intensified in the display panel 400 by using a roll belt having a two-division structure and the middle support 230.

In addition, the first roll belt 500A and the second roll belt 500B may be disposed spaced apart from each other in the second direction and may be formed in a bar shape. Such bar-shaped first roll belt 500A and second roll belt 500B may be disposed in the second direction. In this case, a plurality of first roll belts 500A may be disposed spaced apart from each other along the first direction, and a plurality of second roll belts 500B may also be disposed spaced apart from each other along the first direction.

In addition, the first roll belt 500A and the second roll belt 500B may be formed in the same shape.

Referring to FIGS. 3 and 4, each of the first roll belt 500A and the second roll belt 500B may include a belt body 510 disposed to protrude from the display panel, and a first protrusion 520 formed to protrude from the belt body 510 toward the middle support 230 and a second protrusion 530 formed to protrude from the belt body 510 toward the side wall 220. Accordingly, the belt body of the first roll belt 500A may be denoted by reference numeral 510A, the first protrusion may be denoted by reference numeral 520A, and the second protrusion may be denoted by reference numeral 530A. In addition, the belt body of the second roll belt 500B may be denoted by reference numeral 510B, the first protrusion may be denoted by reference numeral 520B, and the second protrusion may be denoted by reference numeral 530B. Here, the belt body 510, the first protrusion 520 and the second protrusion 530 may be integrally formed, and may be formed of a metal material such as aluminum or stainless steel.

The belt body 510 may be formed in a bar shape and may be fixed to the display panel 400. When the sliding module 200 is moved, the belt body 510 may be in contact with the outer circumferential surface of the roller 240.

The first protrusion 520A of the first roll belt 500A may be disposed in the first groove 231 of the middle support 230. Accordingly, the first protrusion 520A of the first roll belt 500A may be supported by the middle support 230, so that it is possible to suppress a problem in which the creasing or lifting phenomenon is intensified in the display panel 400.

The second protrusion 530A of the first roll belt 500A may be disposed between the first step 221A of the first sidewall 220A and the first roller 240A. Accordingly, the second protrusion 530A of the first roll belt 500A is supported by the first step 221A of the first sidewall 220A, so that it is possible to suppress a problem in which the creasing or lifting phenomenon is intensified in the display panel 400.

The first protrusion 520B of the second roll belt 500B may be disposed in the second groove 232 of the middle support 230. Accordingly, the first protrusion 520B of the second roll belt 500B is supported by the middle support 230, so that it is possible to suppress a problem in which the creasing or lifting phenomenon is intensified in the display panel 400.

The second protrusion 530B of the second roll belt 500B may be disposed between the second step 221B of the second side wall 220B and the second roller 240B. Accordingly, the second protrusion 530B of the second roll belt 500B is supported by the second step 221B of the second sidewall 220B, so that it is possible to suppress a problem in which the creasing or lifting phenomenon is intensified in the display panel 400.

As shown in FIG. 4, all of the belt body 510, the first protrusion 520 and the second protrusion 530 may be in contact with the roller 240.

Figure 18:
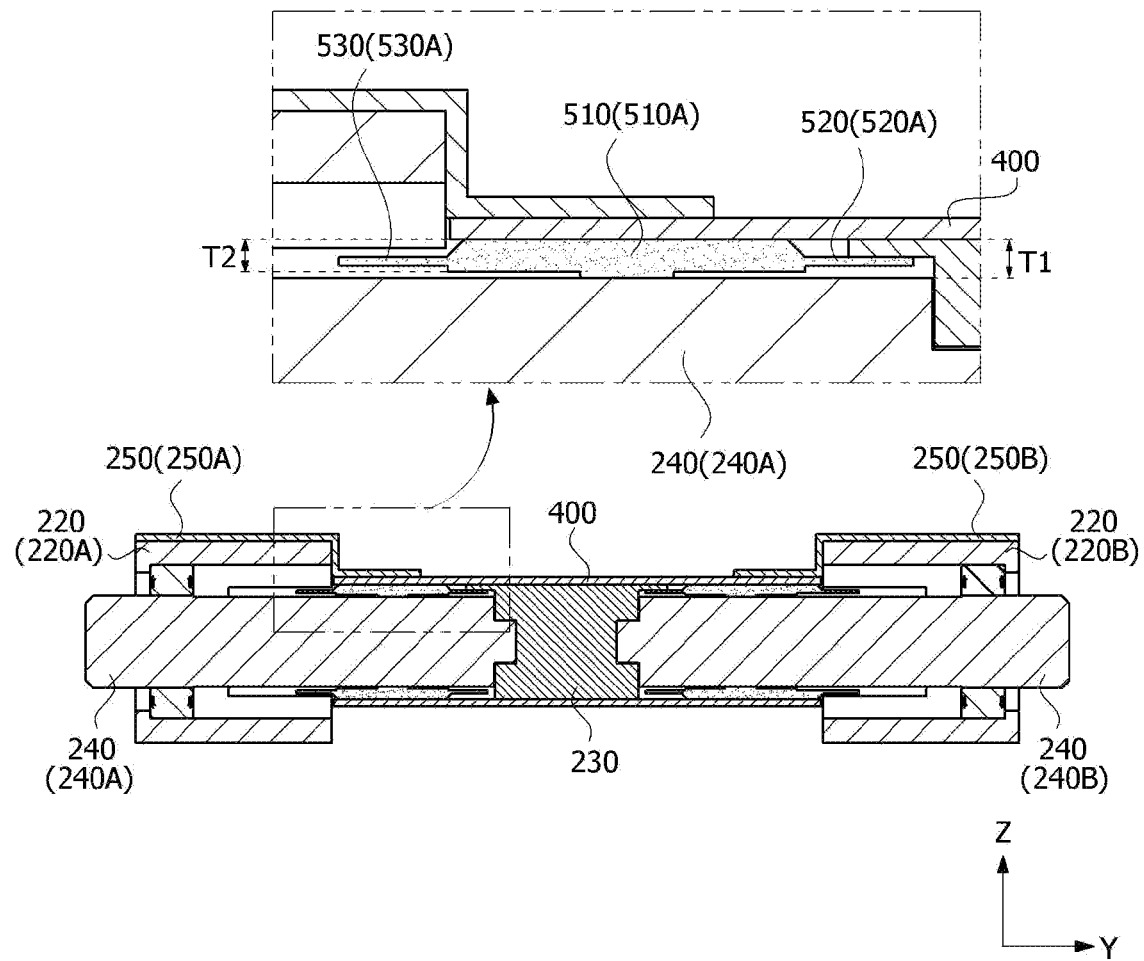
FIG. 18 is a view illustrating a modified example of a roll belt.

In addition, the thickness of the belt body 510 in the third direction may be greater than the thicknesses of the first protrusion 520 and the second protrusion 530 in the third direction. FIG. 18 is a view illustrating a modified example of a roll belt.

Referring to FIG. 18, each belt body 510 of the first roll belt 500A and the second roll belt 500B may be formed stepwise. Accordingly, the thickness Tl of the central side of the belt body 510 based on the second direction is greater than the thickness of the edge of the belt body 510. Therefore, only the central side of the belt body 510 may be in contact with the roller 240. That is, only a portion of the area of the belt body 510 may be in contact with the roller 240. Here, the display device according to one embodiment of the present disclosure is exemplified in that one step structure is formed in the belt body 510 of each of the first roll belt 500A and the second roll belt 500B, but is not necessarily limited thereto. For example, a plurality of stepped structures may be formed in the belt body 510 in consideration of a load formed in contact with the roller 240 and deformation of the roll belt due to the load.

In this case, the first protrusion 520 and the second protrusion 530 of each of the first roll belt 500A and the second roll belt 500B may be disposed to be spaced apart from the outer circumferential surface of the roller 240. Accordingly, deformation of the first protrusion 520 and the second protrusion 530 due to contact with the roller 240 may be prevented.

Figure 19:
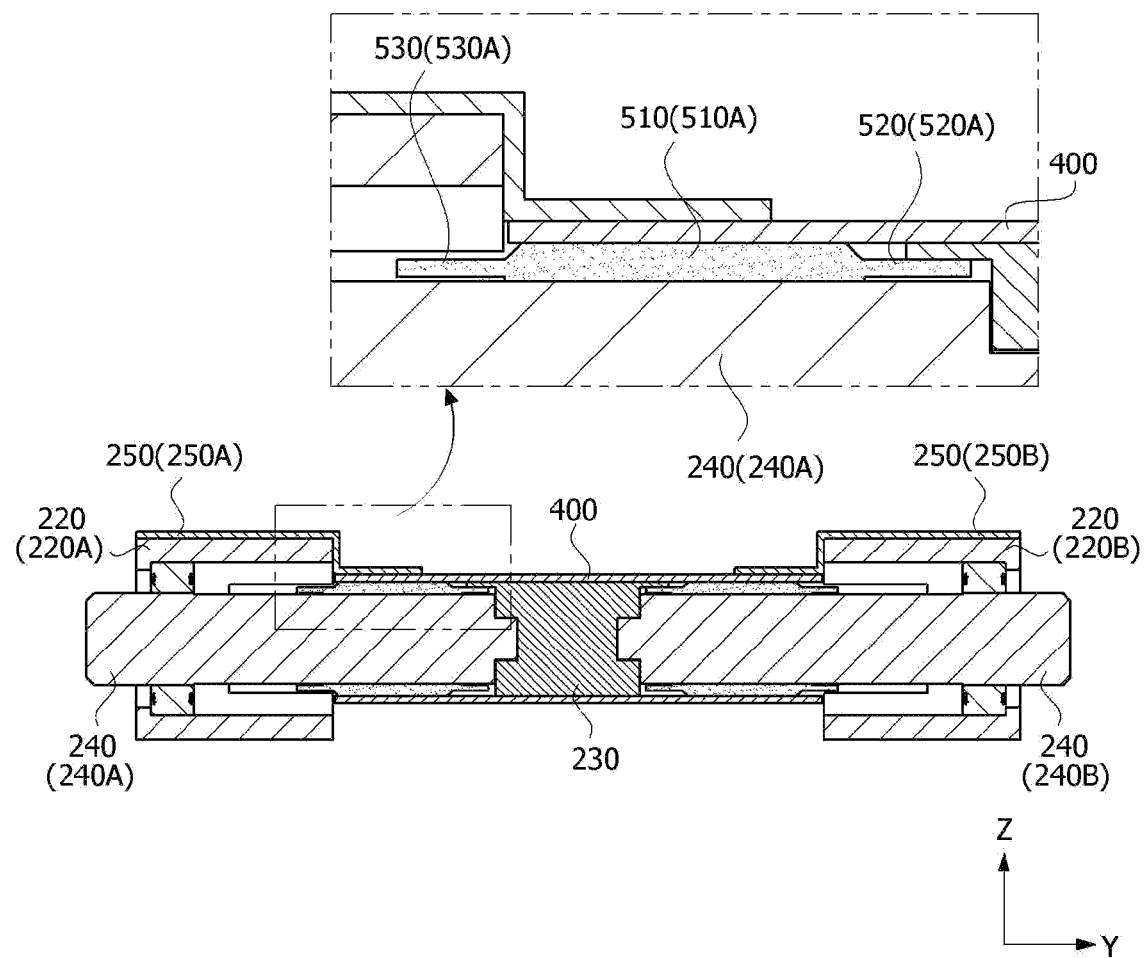
FIG. 19 is a view illustrating another modified example of a roll belt.

FIG. 19 is a view illustrating another modified example of a roll belt.

Referring to FIG. 19, each belt body 510 of the first roll belt 500A and the second roll belt 500B is disposed in contact with the roller 240, and the first protrusion 520 and the second protrusions 530 may be disposed to be spaced apart from an outer circumferential surface of the roller 240. Accordingly, only the belt body 510 may be in contact with the roller 2240.

The embodiments of the present disclosure described above are briefly described below.

A display device according to the embodiment disclosed in the present specification comprises: a base; a sliding module slidably disposed on the base in a first direction; and a display panel module having one side fixed to the base and the other side fixed to the sliding module, wherein the sliding module includes a body, two sidewalls disposed on one side and the other side of the body, a middle support coupled to the body, and two rollers rotatably disposed between the sidewalls and the middle support, the display panel module includes a display panel and a first roll belt and a second roll belt disposed to be spaced apart from each other on a rear surface of the display panel in a second direction, and the middle support is disposed between the first roll belt and the second roll belt to support end portions of each of the first roll belt and the second roll belt when the sliding module is moved.

A display device according to the embodiment disclosed in the present specification comprises: a base; a sliding module slidably disposed on the base in a first direction; and a display panel module having one side fixed to the base and the other side fixed to the sliding module, wherein the sliding module includes a body, two sidewalls disposed on one side and the other side of the body, a middle support coupled to the body, and two rollers rotatably disposed between the sidewalls and the middle support, the display panel module includes a display panel and a first roll belt and a second roll belt disposed to be spaced apart from each other on a rear surface of the display panel in a second direction, the middle support is disposed between the first roll belt and the second roll belt, an end portion of one side of the first roll belt is disposed in a first groove of the middle support, and an end portion of one side of the second roll belt is disposed in a second groove of the middle support.

In the display device according to the embodiment disclosed in the present specification, the first roll belt is disposed in a plurality of numbers to be spaced apart from each other along the first direction, and the second roll belt is disposed in a plurality of numbers to be spaced apart from each other along the first direction.

In the display device according to the embodiment disclosed in the present specification, each of the first roll belt and the second roll belt includes a belt body disposed to protrude from the display panel and a first protrusion formed to protrude from the belt body toward the middle support, the first protrusion of the first roll belt is disposed in the first groove, and the first protrusion of the second roll belt is disposed in the second groove.

In the display device according to the embodiment disclosed in the present specification, each of the first roll belt and the second roll belt further includes a second protrusion formed to protrude from the belt body toward the side wall, the second protrusion of the first roll belt is overlapped with a step formed on one of the two side walls, and the second protrusion of the second roll belt is overlapped with a step formed on the other of the two side walls.

In the display device according to the embodiment disclosed in the present specification, the roller is in contact with the belt body, the first protrusion, and the second protrusion.

In the display device according to the embodiment disclosed in the present specification, the first protrusion and the second protrusion are disposed to be spaced apart from the roller.

In the display device according to the embodiment disclosed in the present specification, based on the second direction, a thickness of the central side of the belt body is greater than a thickness of the edge of the belt body.

In the display device according to the embodiment disclosed in the present specification, a thickness of the belt body is greater than thicknesses of each of the first protrusion and the second protrusion.

In the display device according to the embodiment disclosed in the present specification, the sidewalls includes a first sidewall and a second sidewall, and a first separation distance from the first sidewall to the middle support is equal to a second separation distance from the second sidewall to the middle support.

In the display device according to the embodiment disclosed in the present specification, the sliding module further includes a cover disposed on the sidewalls, and the cover is overlapped with an end portion along the second direction of the display panel in a third direction.

In the display device according to the embodiment disclosed in the present specification, the second protrusions of the first roll belt and the second roll belt are overlapped with the cover in a third direction.

In the display device according to the embodiment disclosed in the present specification, the first roll belt and the second roll belt are formed in the same shape.

In the display device according to the embodiment disclosed in the present specification, the first roll belt and the second roll belt are formed of a metal material, and the roller is formed of a soft material.

In the display device according to the embodiment disclosed in the present specification, a width W of the display panel in the second direction is smaller than a distance D from one end of the second protrusion of the first roll belt to one end of the second protrusion of the second roll belt.

In the display device according to the embodiment disclosed in the present specification, when the sliding module is moved, the two rollers are rotated by being in contact with the first roll belt and the second roll belt.

A display device according to the embodiment disclosed in the present specification comprises: a base; a sliding module slidably disposed on the base in a first direction; and a display panel module having one side fixed to the base and the other side fixed to the sliding module, wherein the sliding module includes a body, two sidewalls disposed on one side and the other side of the body, a middle support coupled to the body, and two rollers rotatably disposed between the sidewalls and the middle support, the display panel module includes a display panel and a first roll belt and a second roll belt disposed to be spaced apart from each other on a rear surface of the display panel in a second direction, and the first roll belt and the second roll belt each include a first protrusion supported by the middle support and a second protrusion supported by the sidewalls.

A display device according to the embodiment disclosed in the present specification comprises: a base; a sliding module slidably disposed on the base in a first direction; and a display panel module having one side fixed to the base and the other side fixed to the sliding module, wherein the sliding module includes a body, two sidewalls disposed on one side and the other side of the body, a middle support coupled to the body, and two rollers rotatably disposed between the sidewalls and the middle support, the display panel module includes a display panel and a first roll belt and a second roll belt disposed to be spaced apart from each other on a rear surface of the display panel in a second direction, and the middle support includes a first surface and a second surface in contact with the display panel.

The technical benefits and effects to be achieved by the present disclosure, the means for achieving the objects, and effects of the present disclosure described above do not specify essential features of the claims, and thus, the scope of the claims is not limited to the disclosure of the present disclosure.

Although the embodiments of the present disclosure have been described in more detail with reference to the accompanying drawings, the present disclosure is not limited thereto and may be embodied in many different forms without departing from the technical concept of the present disclosure. Therefore, the embodiments disclosed in the present disclosure are provided for illustrative purposes only and are not intended to limit the technical concept of the present disclosure. The scope of the technical concept of the present disclosure is not limited thereto. Therefore, it should be understood that the above-described embodiments are illustrative in all aspects and do not limit the present disclosure. The protective scope of the present disclosure should be construed based on the following claims, and all the technical concepts in the equivalent scope thereof should be construed as falling within the scope of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A display device comprising:
a base;
a sliding module slidably disposed on the base, and configured to move in a first direction; and
a display panel module having a first side fixed to the base and a second side fixed to the sliding module,
wherein:
the sliding module includes a body, two sidewalls disposed on one side and another side of the body, a middle support coupled to the body, and a first roller and a second roller rotatably disposed between the sidewalls and the middle support,
the display panel module includes a display panel and a first roll belt and a second roll belt disposed to be spaced apart from each other on a rear surface of the display panel in a second direction,
the middle support is disposed between the first roll belt and the second roll belt to support end portions of each of the first roll belt and the second roll belt when the sliding module is moved, and
a rotation center of each of the first roller and the second roller is in the second direction.

2. The display device of claim 1, wherein an end portion of one side of the first roll belt is disposed in a first groove of the middle support, and
an end portion of one side of the second roll belt is disposed in a second groove of the middle support.

3. A display device comprising:
a base;
a sliding module slidably disposed on the base, and configured to move in a first direction; and
a display panel module having one side fixed to the base and another side fixed to the sliding module,
wherein the sliding module includes a body, two sidewalls disposed on one side and another side of the body, a middle support coupled to the body, and a first roller and a second roller rotatably disposed between the sidewalls and the middle support,
the display panel module includes a display panel and a first roll belt and a second roll belt disposed to be spaced apart from each other on a rear surface of the display panel in a second direction,
the middle support is disposed between the first roll belt and the second roll belt,
an end portion of one side of the first roll belt is disposed in a first groove of the middle support,
an end portion of one side of the second roll belt is disposed in a second groove of the middle support, and
a rotation center of each of the first roller and the second roller is in the second direction.

4. The display device of claim 3, wherein the first roll belt includes plurality of roll belt members spaced apart from each other along the first direction, and
the second roll belt includes a plurality of roll belt members spaced apart from each other along the first direction.

5. The display device of claim 4, wherein each of the first roll belt and the second roll belt includes a belt body disposed to protrude from the display panel, and a first protrusion formed to protrude from the belt body toward the middle support,
the first protrusion of the first roll belt is disposed in the first groove, and
the first protrusion of the second roll belt is disposed in the second groove.

6. The display device of claim 5, wherein each of the first roll belt and the second roll belt further includes a second protrusion formed to protrude from the belt body toward the side wall,
the second protrusion of the first roll belt is overlapped with a step formed on one of the two side walls, and
the second protrusion of the second roll belt is overlapped with a step formed on the other of the two side walls.

7. The display device of claim 6, wherein the roller is in contact with the belt body, the first protrusion, and the second protrusion.

8. The display device of claim 6, wherein the first protrusion and the second protrusion are disposed to be spaced apart from the rollers.

9. The display device of claim 8, wherein, based on the second direction, a thickness of a central side of the belt body is greater than a thickness of the edge of the belt body.

10. The display device of claim 6, wherein a thickness of the belt body is greater than a thickness of each of the first protrusion and the second protrusion.

11. The display device of claim 3, wherein the sidewalls include a first sidewall and a second sidewall, and
a first separation distance from the first sidewall to the middle support is equal to a second separation distance from the second sidewall to the middle support.

12. The display device of claim 3, wherein the sliding module further includes a cover disposed on the sidewalls, and
the cover is overlapped with an end portion of the display panel in a third direction.

13. The display device of claim 12, wherein second protrusions of the first roll belt and the second roll belt are overlapped with the cover in the third direction.

14. The display device of claim 3, wherein the first roll belt and the second roll belt of a same shape.

15. The display device of claim 3, wherein the first roll belt and the second roll belt are of a metal material, and the rollers are of a soft material.

16. The display device of claim 6, wherein a width of the display panel in the second direction is smaller than a distance from an end of the second protrusion of the first roll belt to an end of the second protrusion of the second roll belt.

17. The display device of claim 3, wherein when the sliding module is moved, the two rollers are rotated by being in contact with the first roll belt and the second roll belt.

18. The display device of claim 3, wherein the display panel includes a first display area and a second display area, and
   the number of pixels in the first display area is different from the number of pixels in the second display area.

19. The display device of claim 3, wherein the display panel includes a first display area and a second display area, and
   the second display area includes a plurality of light-transmitting areas.

* * * * *